United States Patent
Menon et al.

(10) Patent No.: US 7,050,799 B2
(45) Date of Patent: *May 23, 2006

(54) WIRELESS LOCAL LOOP WITH INTELLIGENT BASE STATION

(75) Inventors: Narayan P. Menon, Colorado Springs, CO (US); Richard Nelhams, Monument, CO (US); Ismail I. Sola, Colorado Springs, CO (US)

(73) Assignee: Intel Corporation, Santa Clara, CA (US)

( * ) Notice: Subject to any disclaimer, the term of this patent is extended or adjusted under 35 U.S.C. 154(b) by 373 days.

This patent is subject to a terminal disclaimer.

(21) Appl. No.: 10/229,449

(22) Filed: Aug. 28, 2002

(65) Prior Publication Data

US 2003/0008632 A1    Jan. 9, 2003

Related U.S. Application Data

(63) Continuation of application No. 09/483,267, filed on Jan. 13, 2000, now Pat. No. 6,496,694.

(51) Int. Cl.
*H04Q 7/20* (2006.01)

(52) U.S. Cl. ............... 455/426.2; 455/424; 455/554.1; 455/561

(58) Field of Classification Search .......... 455/426.1, 455/424, 442, 74.1, 561, 557, 550.1, 552.1, 455/426.2, 554.1, 403, 462, 436, 423, 425; 370/535, 331, 332, 401; 379/229, 230
See application file for complete search history.

(56) References Cited

U.S. PATENT DOCUMENTS

| | | | |
|---|---|---|---|
| 4,922,517 A * | 5/1990 | West et al. ............ 455/426.1 |
| 5,117,450 A | 5/1992 | Joglekar et al. | |
| 5,189,734 A | 2/1993 | Bailey et al. | |
| 5,195,090 A | 3/1993 | Bolliger et al. | |
| 5,267,261 A | 11/1993 | Blakeney, II et al. | |
| 5,325,419 A * | 6/1994 | Connolly et al. ........ 455/435.1 |
| 5,438,329 A | 8/1995 | Gastouniotis et al. | |
| 5,440,613 A | 8/1995 | Fuentes | |
| 5,590,177 A | 12/1996 | Vilmur et al. | |
| 5,600,633 A | 2/1997 | Jaisingh et al. | |
| 5,640,679 A | 6/1997 | Lundqvist et al. | |

(Continued)

*Primary Examiner*—Charles N. Appiah
(74) *Attorney, Agent, or Firm*—Blakely, Sokoloff, Taylor & Zafman LLP

(57) ABSTRACT

A communication system for providing wireless local loop services comprises an intelligent base station for communicating with one or more customer premises remote units (CPRUs), each of which connects to a non-wireless device. Each CPRU has a wireless transceiver for over-the-air communication with the intelligent base station. The intelligent base station connects, without the assistance of a base station controller, to a mobile switching center (MSC), through a GSM A-interface or a specialized derivative thereof, and thereby to a public switched telephone network (PSTN). The intelligent base station employs a subset of GSM functionality, enabling the CPRU to take advantage of various advanced telephony features. A transcoder and rate adapter unit may be added between the intelligent base station and the mobile switching center. The intelligent base station may be capable of communicating with both mobile users and fixed wireless local loop customers, using time division multiple access (TDMA) to communicate with multiple users. The intelligent base station may transmit and receive messages using spread spectrum encoding. If mobility is provided within the system, intelligent base stations within a cluster may be connected over physical links so that signalling and bearer channels supporting a call from a mobile user are tunneled through one intelligent base station to the other during handover.

31 Claims, 14 Drawing Sheets

U.S. PATENT DOCUMENTS

| | | |
|---|---|---|
| 5,664,004 A | 9/1997 | Durchman et al. |
| 5,724,665 A * | 3/1998 | Abbasi et al. ............... 455/561 |
| 5,734,979 A | 3/1998 | Lu et al. |
| 5,771,451 A | 6/1998 | Takai et al. |
| 5,884,148 A * | 3/1999 | Bilgic et al. ................ 455/74.1 |
| 5,913,166 A * | 6/1999 | Buttitta et al. .............. 455/436 |
| 5,953,651 A * | 9/1999 | Lu et al. ...................... 455/408 |
| 5,953,675 A | 9/1999 | Rabina et al. |
| 6,014,560 A | 1/2000 | Kramer |
| 6,018,532 A * | 1/2000 | Nilsson et al. .............. 370/535 |
| 6,021,333 A | 2/2000 | Anderson et al. |
| 6,088,587 A * | 7/2000 | Abbadessa ................... 455/424 |
| 6,115,604 A | 9/2000 | Lester et al. |
| 6,173,177 B1 | 1/2001 | Lu et al. |
| 6,178,337 B1 | 1/2001 | Spartz et al. |
| 6,192,055 B1 | 2/2001 | Rasanen |
| 6,212,173 B1 | 4/2001 | Lindsay et al. |
| 6,327,268 B1 | 12/2001 | Sipila |
| 6,496,694 B1 * | 12/2002 | Menon et al. ........... 455/426.2 |
| 6,594,488 B1 * | 7/2003 | Chow et al. ............. 455/426.1 |

\* cited by examiner

GSM BASED WIRELESS LOCAL LOOP SYSTEM

WIRELESS LOCAL LOOP WITH INTELLIGENT BASE STATION

This application is a continuation of U.S. patent Ser. No. 09/483,267, filed Jan. 13, 2000, entitled "Wireless Local Loop With Intelligent Base Station", issued as U.S. Pat. No. 6,496,694 on Dec. 17, 2002.

BACKGROUND OF THE INVENTION

1. Field of the Invention

The field of the present invention relates to communication systems and methods and, in particular, to wireless local loop systems and methods of communicating in wireless local loop systems.

2. Background

Telephone service has traditionally been provided to business and residential customers through fixed landlines that are routed from the telephone network through switching stations to their local destinations. However, the costs associated with providing telephone services to some customers (i.e., those located in remote regions, or geographically harsh environments, or high rise buildings) using conventional cabling methods can be prohibitively expensive. For many network operators this expense is unavoidable, because the provision of service to such customers is often not optional under regulatory requirements to deliver service universally regardless of the cost, sometimes referred to as a "universal service obligation."

In addition, conventional landlines can be expensive and time-consuming to deploy. Service to potential customers can be delayed while telephone lines and cables are being deployed, causing frustration to such customers. In certain areas, the telephone provider may have to spend an excessive amount on telephone lines which might ultimately serve only a small client base. Moreover, maintenance of telephone cabling (e.g., copper lines) can be expensive, and such cabling can be subject to occasional faults which require repair or replacement and can be a significant inconvenience for customers.

In some cases, customers with an existing telephone line are interested in additional lines to serve their growing needs. However, the same type of expense and delays may be encountered in providing additional telephone lines to these customers.

The delay and expense of establishing landlines may also be a disadvantage to a telephone provider desiring to enter a new market quickly and cost effectively. Recent legislation in the United States has increased competition in local markets for provision of basic and enhanced telephone services. Telephone providers wanting to enter these markets rapidly so as to compete against or bypass an incumbent local access network operator may be at a disadvantage if required to deploy an extensive ground network of cabling in order to provide service.

Certain telephone customers have specialized needs that are difficult or unduly expensive to meet using only landlines to connect service. In particular, customers which experience high "churn" (i.e., call turnover) or which require temporary provisioning may not be adequately served by existing landline connections. At the same time, it may not be cost effective to add expensive landlines where only temporary provisioning is required. Examples of customers having such specialized needs may include, e.g., universities and other educational institutions, hospitals, marinas, shopping malls, large exhibitions, construction sites, caravan parks, and the like.

As an additional consideration, a single type of telephone service may not be adequate to address the needs of disparate customers. For example, industrially undeveloped or under-developed countries or regions may require only basic telephone service (i.e., POTS service), whereas industrially advanced countries or regions may require high quality voice, data capability and custom calling features. Customers starting out with basic service may eventually want or need to upgrade to more advanced telephone features.

There is a need for a communication system allowing rapid and/or expedient rollout, so as to provide service in a timely fashion to both presently served markets as well as remotely located or otherwise hard-to-access customers. There is also a need for a communication system allowing easier and more cost-effective service for remote or rural customers. There is further a need for a telephone service that accounts for the needs of both basic and relatively advanced users, and which allows upward migration of features such as high quality voice, data and custom calling options. Additionally, there is need for a communication system that can provide economic telephone service to select customers who have specialized needs, including high churn or temporary provisioning.

SUMMARY OF THE INVENTION

The invention provides in one aspect a communication system for providing wireless local loop services which can be deployed relatively rapidly and which offers the benefits of advanced telephony features.

In one embodiment, a customer premises remote unit (CPRU) has a wireless transceiver for over-the-air communication, and is physically located at or near a customer site. The CPRU communicates wirelessly with an intelligent base station (IBS) that is preferably capable of supporting multiple access communication so as to enable support of multiple CPRUs and/or other users. The intelligent base station directly connects, without the assistance of a base station controller, to a mobile switching center (MSC), preferably through a GSM A-interface or a derivative thereof. The mobile switching center allows access to a public switched telephone network (PSTN). Telephones or other devices connected to the CPRU can thereby communicate with the PSTN over the connection established between the CPRU and the intelligent base station, through the mobile switching center. The intelligent base station preferably employs a subset of GSM functionality, enabling the CPRU to take advantage of various advanced telephony features, and offering an upward migration path for those users initially starting with basic telephone service. Because the intelligent base station can connect directly to the mobile switching center, deployment can be conducted more rapidly, without the need for connecting and configuring base station controllers in the area to be serviced.

In another embodiment, a transcoder and rate adapter unit is added between the intelligent base station and the mobile switching center. In this embodiment, the transcoding rate adaption unit and the CPRU represent peer-to-peer endpoints for ciphering.

In another aspect, an intelligent base station connected-directly to a GSM mobile switching center is capable of communicating with both mobile users and fixed wireless local loop customers, by employing a flexible and robust over-the-air protocol for multiple access communication. In a preferred embodiment, the intelligent base station communicates with user stations (such as mobile handsets, or fixed CPRUs) by dividing a time frame into time slots and assigning the time slots to individual user stations, thereby carrying out time division multiple access communication. The intelligent base station preferably transmits and receives messages which have been encoded using spread spectrum techniques, and thereby transmits and receives messages over a bandwidth that is relatively wide compared with typical narrowband techniques. In one embodiment, the intelligent base station transmits over a first frequency band, while the user stations transmit over a second frequency band, thereby implementing frequency division multiple access (FDMA) and/or frequency division duplex (FDD) communication.

In another embodiment, a wireless local loop subsystem and a wireless mobile subsystem coexist in a single communication system. The wireless local loop subsystem comprises one or more intelligent base stations. The intelligent base stations are connected to a mobile switching center (MSC) over a GSM A-interface. In a particular version of such an embodiment, a intelligent base stations within a cluster are connected over physical links, and when a mobile station communicating with a first intelligent base station in the cluster is handed over to a second intelligent base station in the cluster, signalling and bearer channels supporting the call are tunneled through the first intelligent base station (which becomes the anchor base station) to the second intelligent base station (which becomes the relay base station) over a physical link. The call then proceeds with communication being carried through both the anchor and relay base stations.

Further embodiments as well as modifications, variations and enhancements of the invention are also described herein.

DETAILED DESCRIPTION OF PREFERRED EMBODIMENTS

Figure 1:
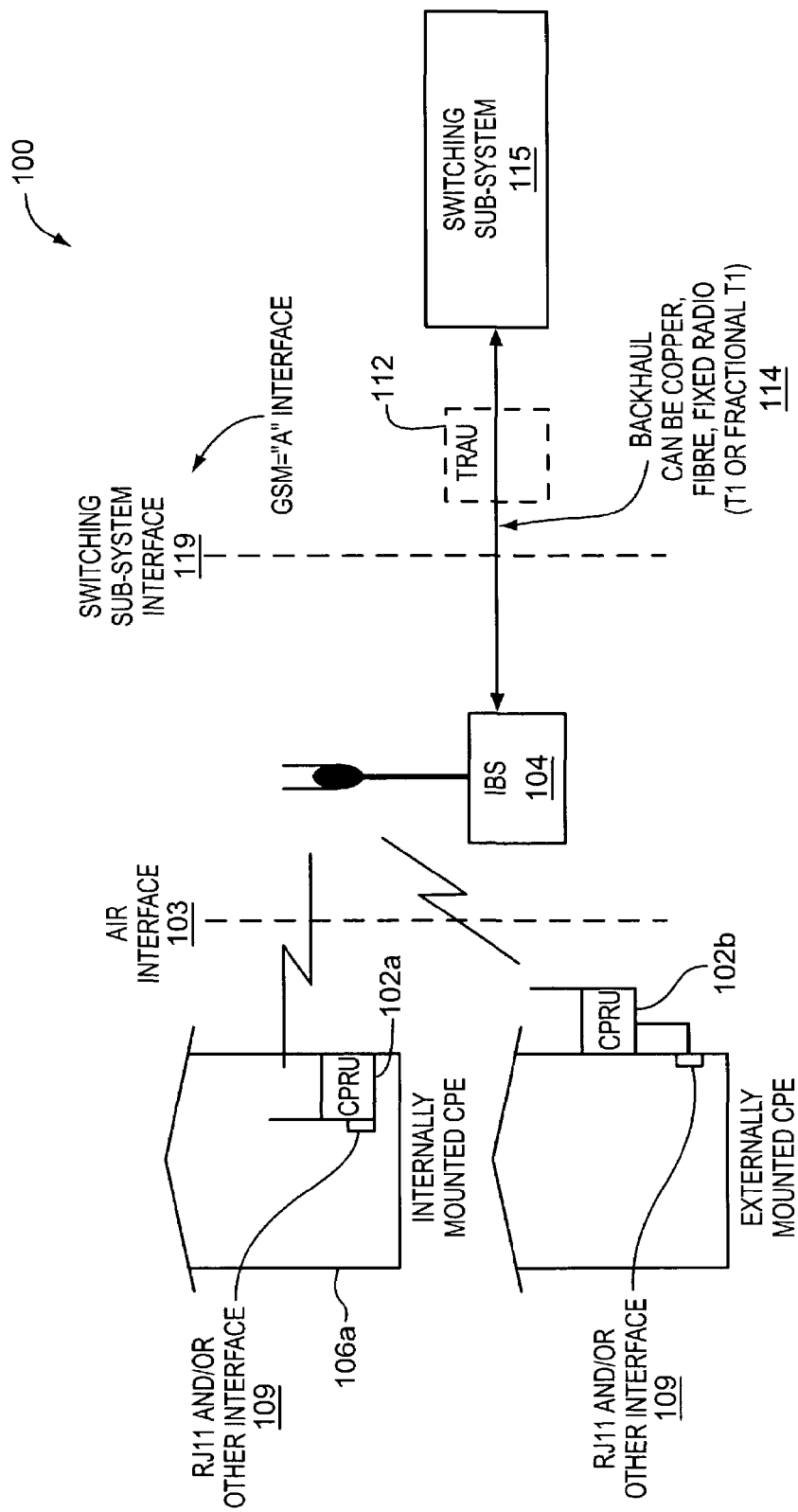
FIG. 1 is a diagram illustrating a wireless local loop system in accordance with one or more aspects of the present invention.

FIG. 1 is a diagram of one embodiment of a wireless local loop system 100 in accordance with one or more aspects of the present invention. As shown in FIG. 1, the wireless local loop system 100 includes an "intelligent" base station 104, which communicates with one or more customer premises remote units (CPRUs) 102 over a wireless communication interface 103. Each CPRU 102 may be physically located at a customer (i.e., user) site 106. The CPRU 102 may be internally mounted within a structure at the customer site 106, as for example CPRU 102a with respect to customer site 106a shown in FIG. 1, or else may be externally mounted outside of a structure at the customer site 106, as for example CPRU 102b with respect to customer site 106b shown in FIG. 1. Telephones or other devices (e.g., fax machines, modems and the like) can be connected to the CPRU 102 over a data interface 109, such as a standard RJ11 and/or other interface (e.g., serial or parallel data port).

As also shown in FIG. 1, the intelligent base station 104 is connected to a switching sub-system 115 (comprising, e.g., a GSM mobile switching center) over a backhaul connection 114, which may comprise, for example, a copper cable, T1 or fractional T1 line, or optical fibers. The backhaul connection from the intelligent base station 104 can optionally be passed through a transcoder and rate adapter unit 112. The intelligent base station 104 preferably communicates with the transcoder and rate adapter unit 112 and/or switching sub-system 115 over a GSM "A" interface 119.

Each CPRU 102 preferably has at least one antenna 121 for transmitting and receiving communication signals to the intelligent base station 104. The intelligent base station 104 preferably has multiple antennas 122 in order to allow antenna diversity and thereby improve the quality of transmitted and/or received signals.

Figure 2:
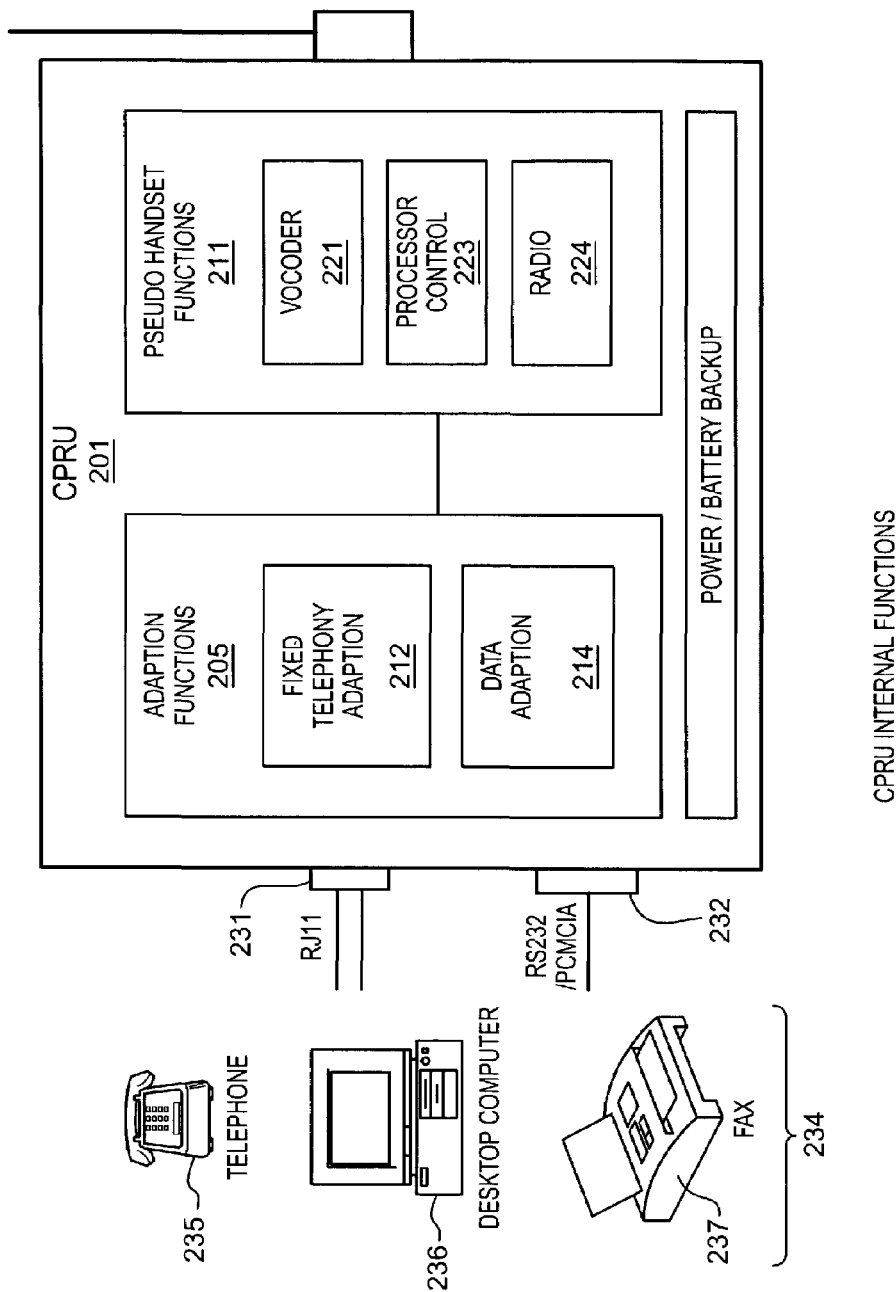
FIG. 2 is a functional block diagram of a preferred customer premises remote unit (CPRU).

FIG. 2 is a functional block diagram of a preferred customer premises remote unit (CPRU) 201 (for example, CPRU 102 in FIG. 1) that may be used in various embodiments of wireless communication systems as described herein. As shown in FIG. 2, a CPRU 201 comprises an adaptation module 205 and a psuedo-handset module 211. The adaptation module 205 provides a set of adaptation functions, while the psudo-handset module 211 provides a set of "pseudo-handset" functions. The adaptation module 205 can be divided into a plurality of other functional sub-modules, including, for example, a fixed telephony adaptation sub-module 212 and a data adaptation sub-module 214. Likewise, the pseudo-handset module 211 can be divided into a plurality of other functional sub-modules, including, for example, a vocoder sub-module 221, a processor control sub-module 223 and a radio sub-module 224.

The CPRU 201 may further comprise a standard RJ11 interface 231, as well as a data interface 232 (e.g., a serial data port, such as an RS232 port, or else a parallel data port), so as to allow communication between the CPRU 201 and various end-use devices 234 (hereinafter referred to as customer premises equipment, or "CPE"), such as a telephone 235, computer 236 (i.e., modem) and/or fax machine 237.

In one aspect, the CPRU 201 provides an interface to fixed telephony equipment and similar equipment located at the customer premises, thereby enabling communication with a public switched telephone network (PSTN) (not shown in FIG. 2) wirelessly across the intelligent base station 104. The pseudo-handset module 211 preferably replicates the core functionality of a mobile handset, but with a number of aspects of the man-machine interface (MMI) functionality excluded. The CPRU 201 thereby may take advantage of wireless communication features developed for mobile communication, and allows an intelligent base station 104 to communicate with both mobile users (e.g, handsets) and fixed users, via the CPRU 201, using essentially the same over-the-air protocol for both the mobile users and fixed users.

The radio sub-module 224 of the pseudo-handset module 211 manages the over-the-air connection with the intelligent base station 104. The processor control module 223 commands the radio sub-module 224, and provides an interface to the adaptation module 205. The vocoder module 221 processes data received from and to be transmitted to the intelligent base station 104, thereby supporting voice communication between the CPE 234 and the PSTN.

The CPRU 201 is preferably compatible with a wide range of equipment as a result of its multiple interfaces 231, 232. The CPRU 201 may be configured to support multiple lines (either RJ11-type lines, or serial and/or parallel data lines) by connecting additional plug-in modules having the appropriate interface(s). Besides supporting voice transmission and reception, the CPRU 201 also enables the transmission and reception of non-voice data by way of the data interface 232. In a preferred embodiment, the CPRU 201 locally generates tones, such as a dial tone, DTMF tones, ring tone, busy signal, and the like. The CPRU 201 also preferably detects off-hook transitions from the CPE 234, and initiates call release procedures towards the network in response to an off-hook transition. When a call is completed, the CPRU 201 provides landline-transparent control of disconnect procedures for clearing initiated by the CPE 234. As part of this function, the CPRU 201 implements the release guard times supported by conventional wireline systems.

The adaptation module 205 of the CPRU 201 preferably includes all of the functions necessary for allowing the CPE 234 (typically a conventional telephone) to interface to the pseudo-handset module 211. In the case of telephony, the fixed telephony adaptation sub-module 212 of the adaptation module 205 preferably supports at least the RJ11 interface 231 (i.e., impedance matching of the line), loop detection (on hook/off hook), tone generation, and pulse detection. A conventional facsimile machine may also be connected through the RJ11 interface 231. For data applications, the adaption module 205 may comprise functionality similar to GSM-based data processing. For example, the data adaptation sub-module 214 of the adaption module 205 may support "group 3" facsimile data, two-way messaging, asynchronous data circuit duplex (300–9600 bits/second, e.g.), synchronous data circuit duplex (1200–9600 bits/second, e.g.), and asynchronous PAD access circuit (300–9600 bits/second, e.g.). Advanced features such as ISDN interworking, true packet data capability, data compression, and time slot aggregation for high-bandwidth data may also be provided.

In addition to the above functions, the CPRU 201 also supports the signaling of DTMF digits during an active call. As part of this function, the CPRU 201 detects DTMF tones from the CPE 234 during an active call and relays the digits to the network via DTAP signalling. Also during a call, the CPRU 201 may pass call progress tones received from the network transparently over the bearer path to the CPE 234. Whenever call progress DTAP signalling is received from the network, the CPRU 201 converts the call progress DTAP signals into call progress tones towards the CPE 234. The CPRU 201 may generate reorder tones to the CPE 234 when needed, so as to indicate congestion of the wireless network or permanent signal timer expiry conditions to the CPE 234.

Additionally, the CPRU 201 also preferably performs a number of functions related to bearer processing. For example, in a preferred embodiment the CPRU 201 performs vocoding for voice communication. In this regard, the vocoder function 221 includes encoding/compression of speech towards the network and decoding/de-compression of speech in the reverse direction (i.e., towards the CPE 234). The CPRU 201 also preferably performs forward error correction (FEC), encryption and decryption for the bearer voice (with the CPRU 201 and transcoder and rate adaptation unit 112 being peer-to-peer endpoints for ciphering), and echo cancellation functions. For encryption and decryption, the CPRU 201 encrypts the bearer data prior to transmission over the air (i.e., over the wireless communication interface 103), and decrypts bearer data received from the network. Echo cancellation functions are supported by the CPRU 201 so as to suppress the echo potentially generated towards the wireless network if, for example, a 2–4 wire hybrid structure is present at the interface with the CPE 234.

In a preferred embodiment, the CPRU 201 in conjunction with the wireless system supports management and security features such as call registration, de-registration, user authentication, ciphering of bearer information, and network management functions. In addition to providing a means for outgoing voice calls, the CPRU 201 may also support outgoing emergency (i.e., "911") calls and end-to-end DTMF signaling during active calls.

Figure 4:
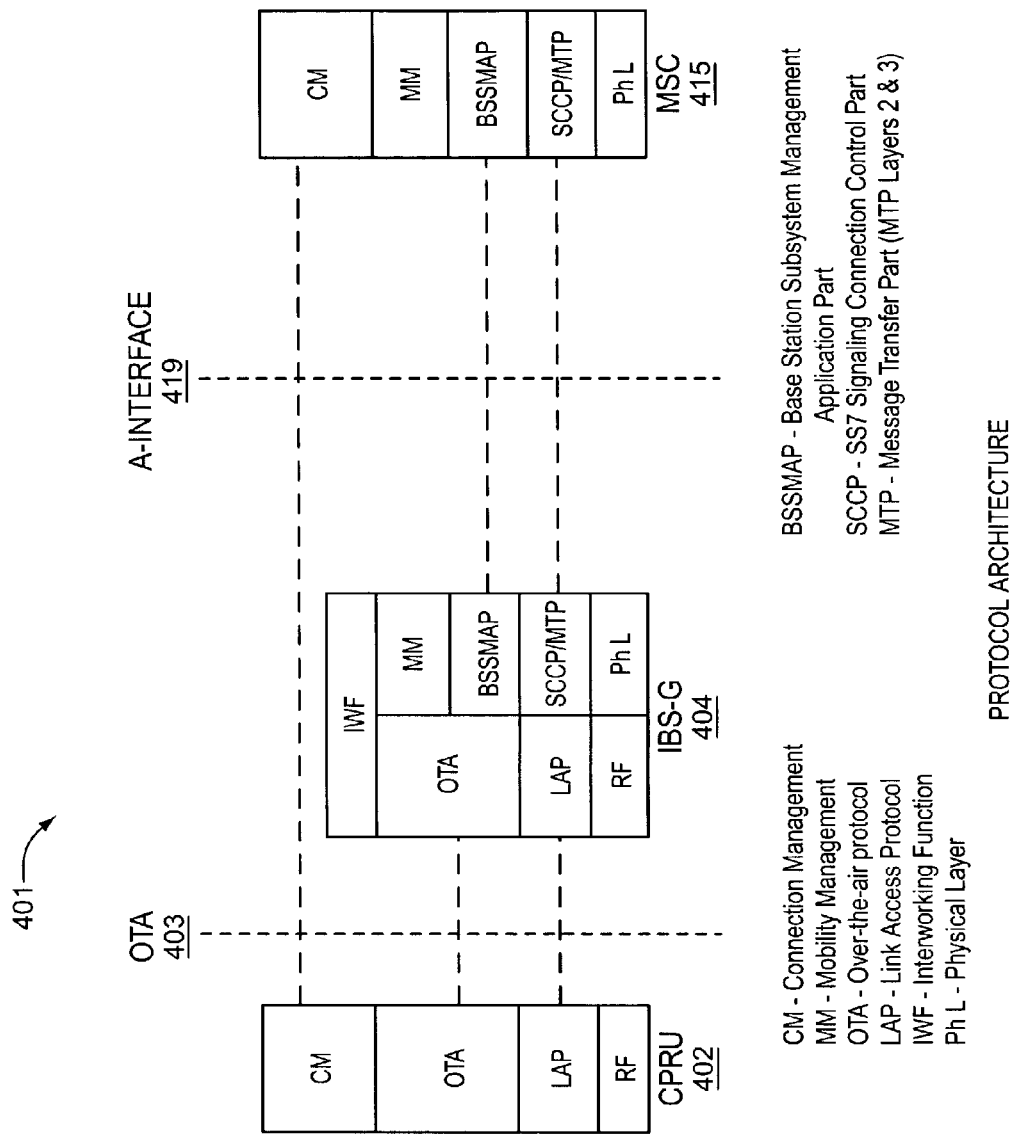
FIG. 4 is a diagram of a protocol architecture for a wireless local loop system utilizing aspects of GSM functionality.
Figure 11:
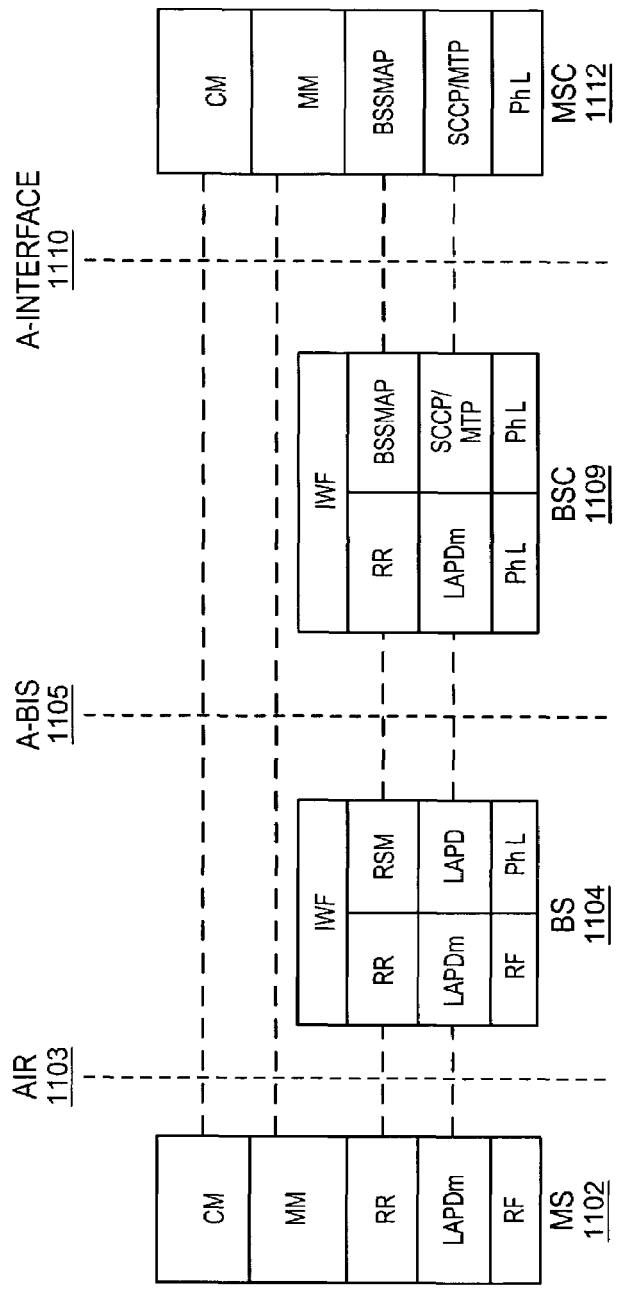
FIG. 11 is an illustration of a protocol architecture for a GSM mobility system.
Figure 12:
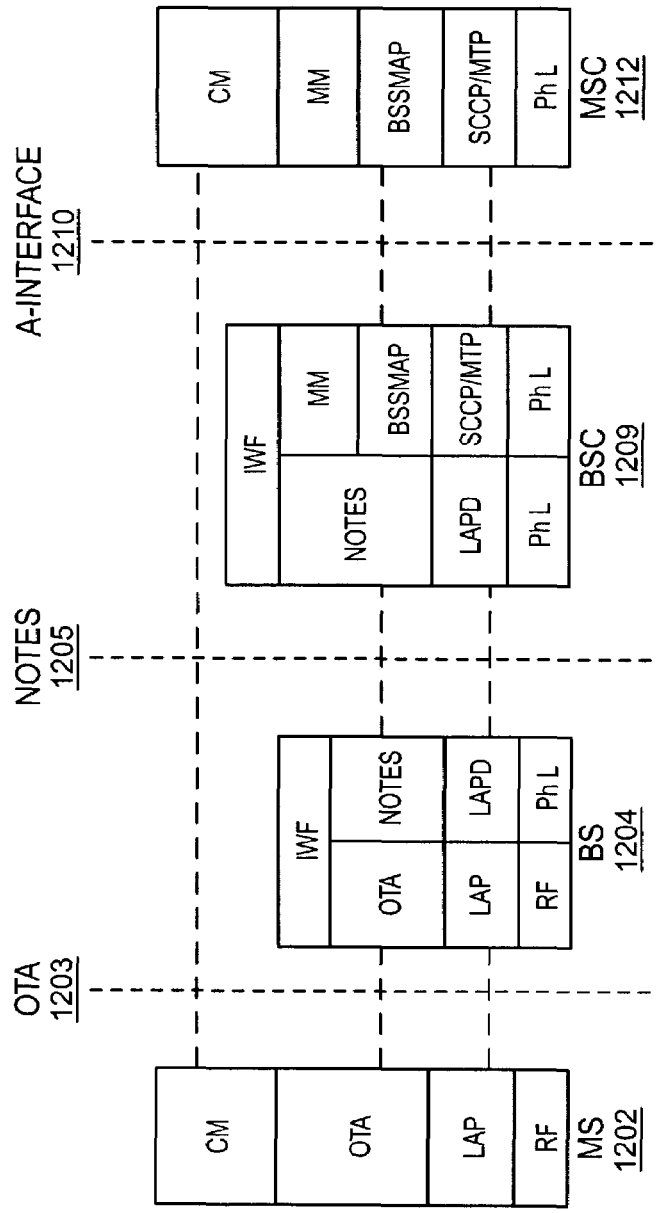
FIG. 12 is an illustration of a protocol architecture for a mobility system using a combination of GSM and non-GSM components.

A protocol architecture for a preferred embodiment of a wireless local loop system is shown in FIG. 4. The protocol architecture of FIG. 4 may be best understood by comparison with the protocol architectures shown in FIGS. 11 and 12, which are associated with a full GSM mobility system and another type of mobility system, respectively, having a GSM mobile switching center interface. In FIGS. 11 and 12, a mobile station 1102 or 1202 is designated as "MS", a base station 1104 or 1204 is designated as "BS", a base station controller 1109 or 1209 is designated as "BSC", and a GSM mobile switching center 1112 or 1212 is designated as "MSC". As shown in FIG. 11, for a GSM mobility system, the mobile station 1102 and the base station 1104 communicate across a GSM over-the-air interface 1103; the base station 1104 and the base station controller 1109 communicate over an A-bis interface 1105; and the base station controller 1109 and the mobile switching center 1112 communicate over the GSM A-interface 1110. In FIG. 12, the mobile station 1202 and the base station 1204 communicate across a non-GSM over-the-air interface 1203 (such as an air interface described, for example, in U.S. Pat. No. 5,671,219, hereby incorporated by reference as if set forth fully herein); the base station 1204 and the base station controller 1209 communicate over a non-GSM signalling interface 1205; and the base staiton controller 1209 and the mobile switching center 1212 communicate over the GSM A-interface 1210.

For the GSM mobility system, as shown in FIG. 11, a connection management (CM) protocol and a mobility management (MM) protocol run between the mobile station 1102 and the mobile switching center 1112. The connection management protocol layer generally handles, for example, call control, supplementary service management and short message services, while the mobility management protocol layer generally handles signalling needed to carry our function srelated to the mobile nature of the user, i.e., location updating, authentication, and the like. A direct transfer application part (DTAP) entity (not shown in FIG. 11) in the base station controller 1109 acts as a relay function for peer-to-peer connection management and mobility management.

As further shown in FIG. 11, a radio resource management (RR) protocol runs between the mobile station 1102 and the base station 1104, as does a link access protocol for D-channel (LAPDm) and the physical radio (RF) connection. A radio subsystem management (RSM) function runs between the base station 1104 and the base station controller 1109, as does a link access protocol for D-channel (LAPD) and a physical layer (PhL) protocol. A base station subsystem management application part (BSSMAP) protocol runs between the base station controller 1109 and the mobile switching center 1112, as does a signalling connection control part (SCCP) protocol, message transfer part (MTP) protocol and physical layer (PhL) protocol. The BSSMAP protocol layer carries out signalling traffic between the base station controller 1109 and the mobile switching center 1112 to effectuate radio resource management and handover functions, including, for example, paging, channel assignment, channel release, ciphering and handover. The SCCP and MTP protocol layers together provide link layer services on the GSM A-interface 1110 to the DTAP and BSSMAP entities. The MTP protocol layer is divided into two sub-layers: an MTP Layer 2 to provide reliable transfer services over the physical signalling link between the base station controller 1109 and the mobile switching center 1112, and an MTP Layer 3 to handle link activation and deactivation functions, as well as link failures. The SCCP establishes and manages, for the BSSMAP and DTAP entities, logical signalling connections between the base station controller 1109 and the mobile switching center 1112, in addition to providing them with connectionless services.

The base station controller 1109 includes an interworking (IWF) function between those protocol layers connected over the GSM A-bis interface 1105 (e.g., the radio subsystem management (RSM) protocol layer and LAPD protocol layer) and those protocol layers connected over the GSM A-interface 1110 (e.g., the BSSMAP protocol layer and the SCCP/MTP protocol layer(s)). Similarly, the base station 104 also includes an interworking (IWF) function between the protocol layers connected over the wireless interface 1103 and those layers connected over the GSM A-bis interface 1105.

In FIG. 12, a protocol architecture is shown for another full mobility system which uses a non-GSM over-the-air protocol, but interfaces with a GSM mobile switching center 1212. The same protocols in FIGS. 11 and 12 carry the same designations (with the understanding that the physical communication protocols may be different, particularly for the physical radio (RF) connection). Accordingly, as can be observed by a comparison of FIGS. 11 and 12, the connectivity over the GSM A-interface 1210 in FIG. 12 is very similar to that over the GSM A-interface 1110 in FIG. 11, except that the mobility management (MM) protocol layer does not reside on the mobile station 1202, but rather is accommodated in the base station controller 1209. However, the connection management (CM) protocol continues to run between the mobile switching center 1212 and the mobile station 1202. The base station controller 1109 translates between the mobility management (MM) protocol and BSS-MAP protocol to a specialized signalling protocol referred to in FIG. 12 as the "Notes" protocol. The Notes protocol runs between the base station controller 1209 and the base station 1204. In the protocol architecture shown in FIG. 12, a non-GSM over-the-air (OTA) protocol and non-GSM link access protocol (LAP) for the D-channel run between the base station 1204 and the mobile station 1202. Further information regarding a particular protocol and method of transferring information between a user station, base station and base station controller may be found in U.S. patent application Ser. No. 08/532,466, filed Sep. 22, 1995, issued as U.S. Pat. No. 6,021,333, assigned to the assignee of the present invention, and hereby incorporated by reference as if set forth fully herein.

Returning to FIG. 4, a protocol architecture 401 is illustrated for a preferred embodiment of a wireless local loop system. In FIG. 4 are shown protocols associated with a CPRU 402, an intelligent base station (IBS) 404, and a GSM mobile switching center (MSC) 415. The principles described with respect to the protocol architecture 401 shown in FIG. 4 may be employed in connection with the wireless local loop system 100 shown in FIG. 1. In one aspect, the intelligent base station 404 may be viewed as incorporating protocol functionality of the base station controllers 1109 and/or 1209 depicted in FIGS. 11 and 12, so as to provide wireless access with GSM functionality (but not necessarily GSM physical connectivity) to the CPRU 402. Further details regarding the specific functionality of the various protocol layers of the wireless local loop system are described below.

For the wireless local loop system protocol architecture shown in FIG. 4, a connection management (CM) protocol runs between the CPRU 402 and the mobile switching center 415. The connection management protocol layer generally handles, for example, call control, supplementary service management and short message services. A direct transfer application part (DTAP) entity (not expressly shown in FIG. 4) in the intelligent base station 404 acts as a relay function for peer-to-peer connection management, with some exceptions as noted later herein.

A mobility management protocol (MM) runs between the intelligent base station 404 and the mobile switching center 415 across the A-interface 419. Because the mobility management protocol layer handles signalling needed to carry our functions related to the mobile nature of the user (i.e., location updating, authentication, and the like), and because these functions are largely unnecessary to the CPRU 402, the mobility management protocol does not run directly to the CPRU 402 (as it does with the GSM system, as shown in FIG. 11). In the wireless local loop system architecture shown in FIG. 4, the mobility management equivalent functions and the radio resource management (RR) functions are combined into the over-the-air (OTA) protocol. Any necessary interworking between the mobility management protocol and the mobility management equivalent functions on the OTA interface is done by the interworking (IWF) entity of the intelligent base station 404.

With no base station controller, the BSSMAP protocol layer resides on the intelligent base station 404, and runs between the intelligent base station 404 and the mobile switching center 415. The BSSMAP protocol layer carries out signalling traffic between the intelligent base station 404 and the mobile switching center 415 to effectuate radio resource management and handover functions. These functions include, for example, paging, channel assignment, channel release, ciphering and handover. The interworking (IWF) entity of the intelligent base station 404 performs any necessary translation between the BSSMAP protocol messages on the A-interface, and signalling traffic across the wireless connection to the CPRU 402.

As with the protocol architectures shown in FIGS. 11 and 12, The SCCP and MTP protocol layers together provide link layer services on the GSM A-interface 419 to the DTAP and BSSMAP entities. The MTP protocol layer is divided into two sub-layers: an MTP Layer 2 to provide reliable transfer services over the physical signalling link between the base station controller 1109 and the mobile switching center 1112, and an MTP Layer 3 to handle link activation and deactivation functions, as well as link failures. The SCCP establishes and manages, for the BSSMAP and DTAP entities, logical signalling connections between the base station controller 1109 and the mobile switching center 1112, in addition to providing them with connectionless services.

Figure 3:
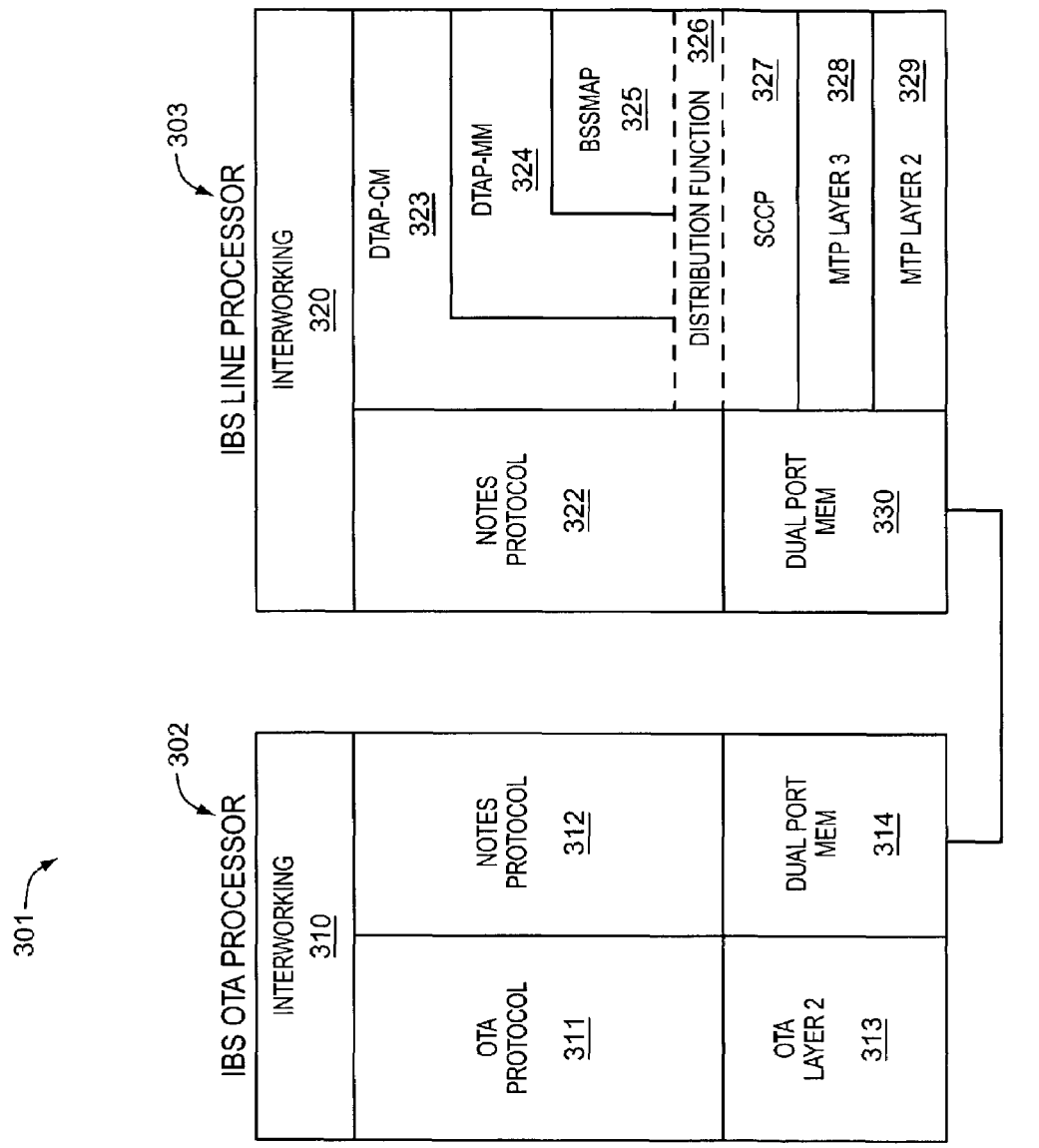
FIG. 3 is a diagram illustrating the internal protocol architecture of a preferred intelligent base station.

FIG. 3 provides additional details of a preferred protocol architecture for a wireless local loop system, with particular focus on the intelligent base station 404 (equally applicable to intelligent base station 104 in FIG. 1). In a preferred embodiment, the intelligent base station 404 comprises two processors 302, 303, a first processor 302 to handle over-the-air communication, and a second processor 303 for handling other functions including communication over the backhaul connection. The two processors 302, 303 of the intelligent base station 404 preferably share a dual-port memory through which information is exchanged.

Figure 3A:
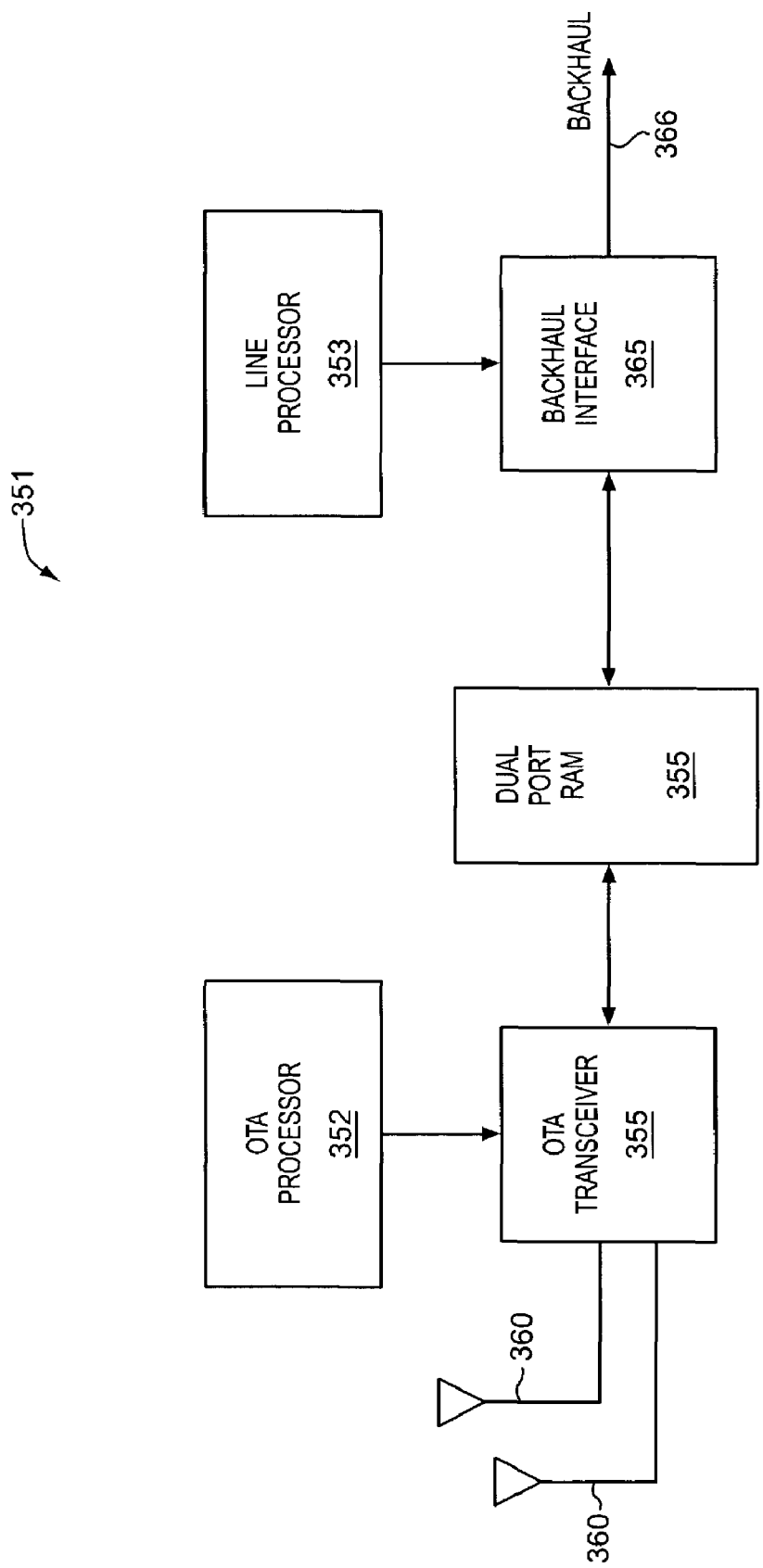
FIG. 3A is a hardware block diagram for an intelligent base station.
Figure 7:
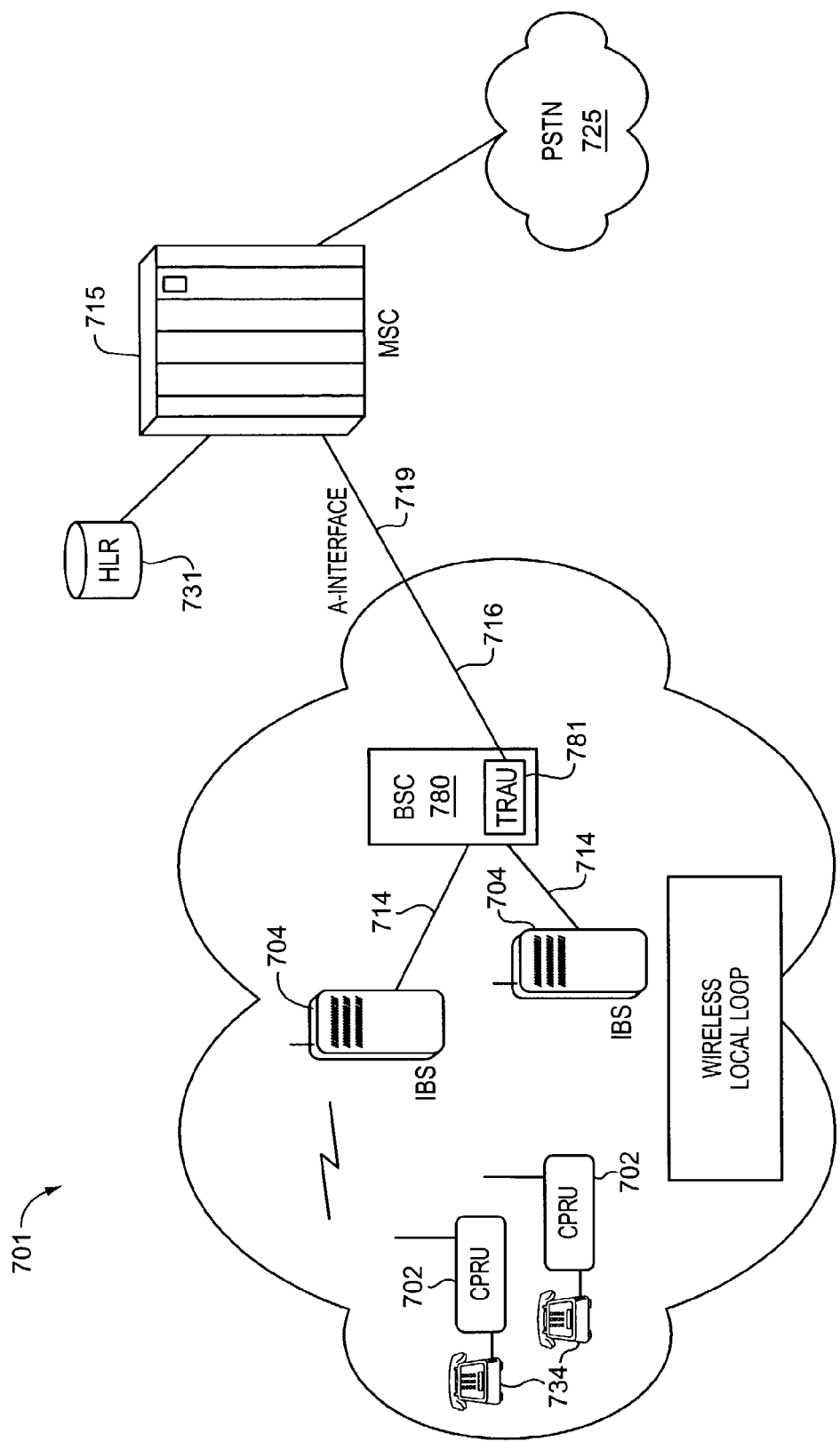
FIG. 7 is a diagram of a wireless local loop communication system employing a base station controller connected to multiple base stations.

FIG. 3A illustrates an exemplary hardware block diagram for an intelligent base station 404 (or 104). As shown in FIG. 3A, an intelligent base station 351 (such as may, for example, be employed as intelligent base station 104 in the FIG. 1 wireless local loop system) may comprise an over-the-air (OTA) transceiver 355 having one or more antennas 360 for communicating with a plurality of mobile or fixed user stations (not shown in FIG. 3A). The OTA transceiver 355 is controlled by an OTA processor 352. The OTA processor 352 and OTA transceiver 355 share a dual-port memory 354 (preferably RAM) with backhaul components, such as backhaul interface 365 and line processor 353. The OTA transceiver 355 stores information received from user stations in receive buffers within the dual port RAM 354, and retrieves information from send buffers within the dual port RAM 354 for formatting and transmission to the user stations, in accordance with the over-the-air protocol employed by the system. The backhaul interface 365, under the control of the line processor 353, retrieves information from the receive buffers in the dual port RAM 354, and formats and transmits the information over a backhaul connection 366. The backhaul interface 365 also receives information over the backhaul connection 366 from upstream components in the system, such as a mobile switching center or a base station controller (as shown in FIG. 7, for example), depending on the particular system architecture. The backhaul connection 366 may comprise a T-1 or fractional T-1 line(s), or any other high-speed communication link. While FIG. 3A illustrates a particular hardware configuration for an intelligent base station 351, many other variations thereof will be apparent to those skilled in the art.

FIG. 3, as noted, illustrates a protocol architecture 301 utilized in a preferred embodiment of the intelligent base station 351. As shown in FIG. 3, the bottom layer of the protocol architecture 301 includes a dual-port memory protocol layer 314 associated with the over-the-air processor 302, and a dual-port memory protocol layer 330 associated with the line processor 303, to allow information to be stored in and retrieved from the dual-port memory in an orderly fashion. An internal signalling protocol layer 312 (referred to herein occasionally as the "Notes" protocol) associated with the over-the-air processor 302 and a corresponding internal signalling protocol layer 322 associated with the line processor 303 allow communication of signalling information between the over-the-air processor 302 and the line processor 303. An over-the-air protocol layer 311 and a "layer 2" over-the-air protocol layer 313 manage the protocol functions which enable the over-the-air processor 302 to communicate wirelessly with various user stations, including, for example, one or more CPRUs 102 (as shown in FIG. 1) or 402 (as shown in FIG. 4).

For the line processor 303, a base station subsystem management application part (BSSMAP) layer 325 carries out signalling communication (i.e., control traffic) that would otherwise be handled in a typical GSM switching sub-system by a base station controller. The BSSMAP layer 325 thus carries out signalling between the intelligent base station 404 (or 104) and the mobile switching center 415 (or switching sub-system 115 shown in FIG. 1) to effect radio resource management and handover functions. These procedures collectively include paging, channel assignment, channel release, ciphering, handover, and the like. The interworking entity 320 of the line processor 303 performs translation between the BSSMAP procedures on the A-interface 419 and the radio resource management and handover procedures for the internal signalling protocol (i.e., Notes) layer 322.

A signalling connection control part (SCCP) layer 327 and message transfer part (MTP) layers 328 and 329 together provide link layer services on the A-interface 419 to the DTAP entities 323, 324 and BSSMAP entity 325. The "layer 2" message transfer part (MTP) layer 329 and "layer 3" message transfer part (MTP) layer 330 manage the protocol functions which enable the line processor 303 to communicate bearer traffic over the backhaul connection. The "layer 2" MTP layer 329 provides reliable transfer services over the physical signalling link between the base station controller (or its equivalent functionality in the intelligent base station 404) and the mobile switching center 415. The "layer 3" MTP layer 328 handles link activation and deactivation functions, as well as link failures. The SCCP layer 327 establishes and manages, for the BSSMAP entity 325 and DTAP entities 323, 324, logical signalling connections between the base station controller (or its equivalent functionality in the intelligent base station 404) and the mobile switching center 415, in addition to providing them with connectionless services.

Figure 9:
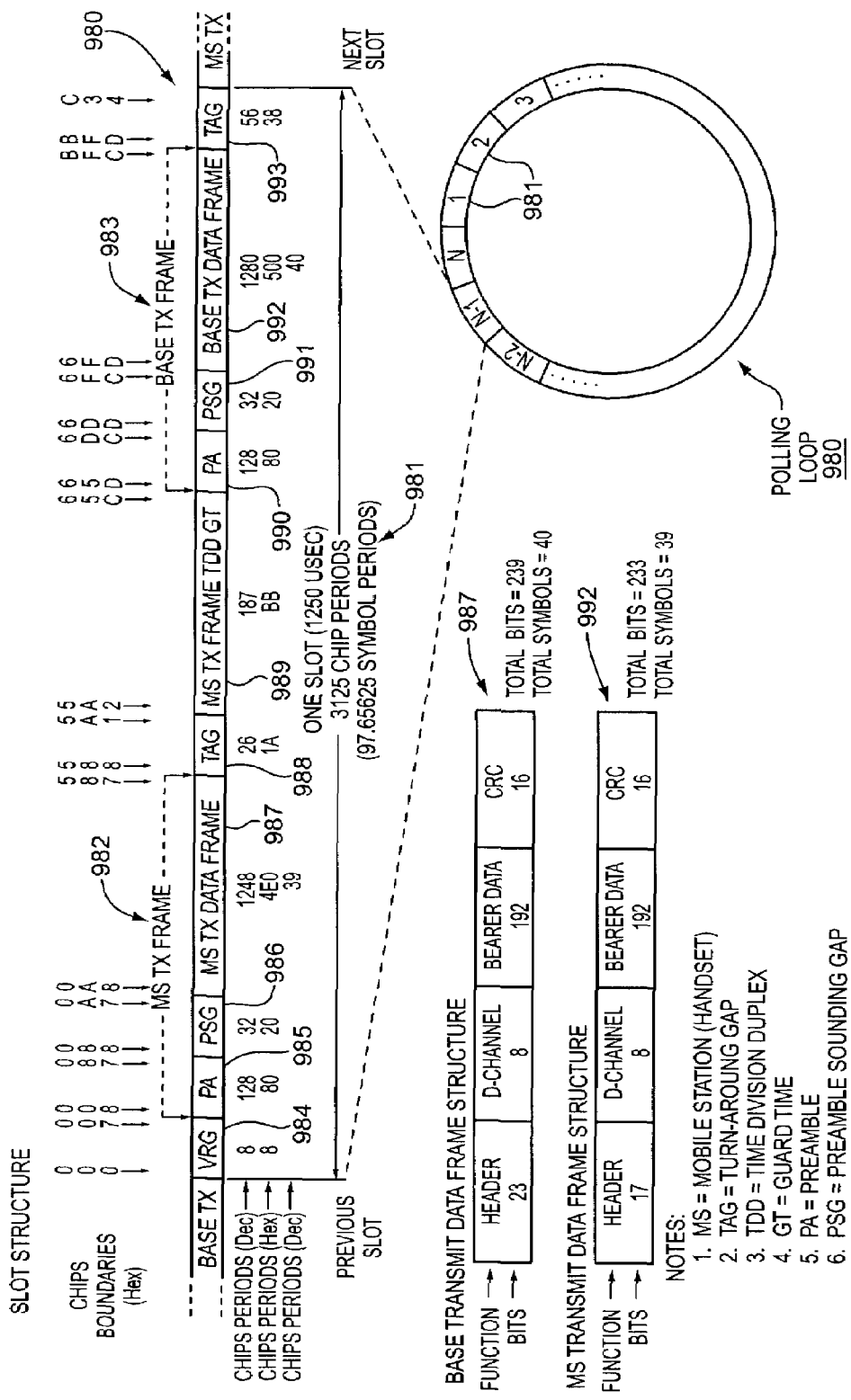
FIG. 9 is a timing diagram for an exemplary airframe structure supporting multiple access communication, as may be used in connection with a wireless local loop system.
Figure 10:
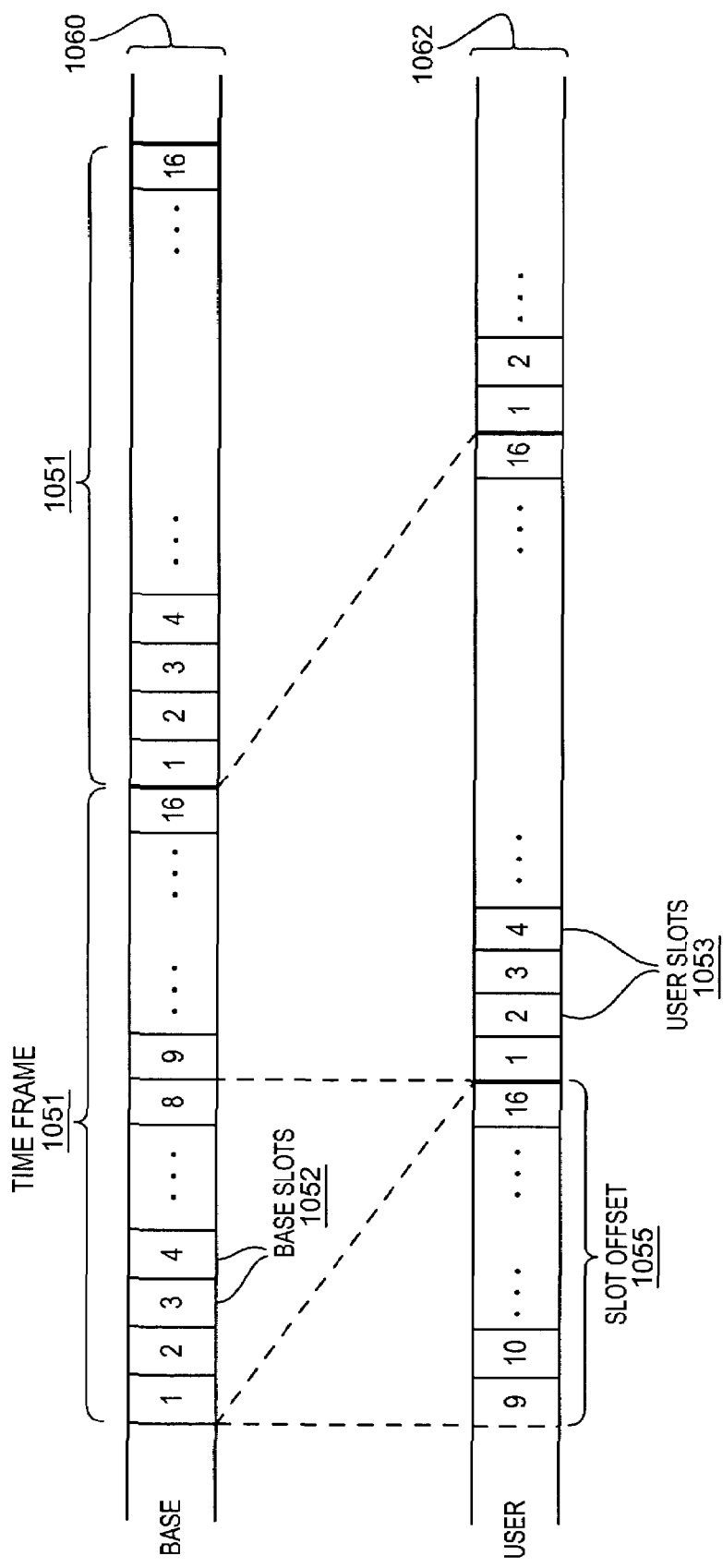
FIG. 10 is a timing diagram for an alternative airframe structure supporting multiple access communication, as may be used in a wireless local loop communication system.

The over-the-air (OTA) protocal layer 311 and "layer 2" OTA layer 313 of the OTA processor 302 collectively manage the functions necessary for over-the-air communication with user stations (whether mobile or fixed). At the physical layer, a variety of different over-the-air protocols may be used in conjunction with the intelligent base station 404, and examples of such protocols are illustrated in FIGS. 9 and 10 hereof and described in more detail later herein.

Further details of signalling and protocol functionality will now be described, with reference to FIGS. 3 and 4, beginning with the MTP, SCCP and BSSMAP functions. The "layer 2" MTP layer 329 of the intelligent base station controller 404 handles the functions and procedures relating to the reliable, sequenced, flow-controlled transfer of A-interface signalling messages over a signalling link. A signalling message delivered by the higher levels is transferred over the signalling link in variable length "signal units." The "layer 2" MTP layer 329 delimits signal units by means of flags (using bit stuffing to prevent flag imitation), and implements error detection by means of check bits included in each signal unit. Explicit sequence numbers in each signal unit along with the use of explicit acknowledgments for receipt assist in controlling signal unit sequencing. Error correction is handled by retransmission of signal units not properly received. A failure of the signalling link is detected by monitoring signal unit error rate, and the "layer 2" MTP layer 329 is responsible for signalling link recovery in the event of a failure. Procedures utilized by the "layer 2" MTP layer 329 are, in certain aspects, based upon GSM Recommendation 08.06 (which in turn refers to CCITT Recommendation Q.703), hereby incorporated by reference as if set forth fully herein.

The "layer 3" MTP layer 328 of the intelligent base station controller 404 provides message routing, signalling traffic and signalling link management functions. More specifically, the "layer 3" MTP layer 328 transfers outbound signalling messages to the signalling link(s), and transfers incoming signalling messages to the SCCP layer 327. The "layer 3" MTP layer 328 preferably is capable of managing multiple signalling links, and inhibits or uninhibits signalling links on management command. The "layer 3" MTP layer 328 performs changeover of signalling traffic to healthy signalling links in case of a link failure, and can perform changeback of signalling traffic when a previously failed link becomes active. Signalling management functions performed by the "layer 3" MTP layer 328 include activation, de-activation and restoration of signalling links. Procedures utilized by the "layer 3" MTP layer 328 are, in certain aspects, based upon GSM Recommendation 8.06 (which in turn refers to CCITT Recommendation Q.704), previously incorporated by reference herein.

The SCCP layer 327 of the intelligent base station 404 supports signalling messages between the intelligent base station 404 and the mobile switching center 415. The BSSMAP entity 325, DTAP mobility management (MM) entity 324 and DTAP connection management (CM) entity 323 all use the SCCP layer 327 of the intelligent base station 404. The SCCP layer 327 provides both connection-oriented and connectionless services. Procedures utilized by the SCCP layer 327 are set forth in GSM Recommendation 8.06 (which in turn refers to CCITT Recommendations Q.711–Q.714), previously incorporated by reference herein. Among other thigns, GSM Recommendation 8.06 specifies usage of Class 0 SCCP for connectionless services, and Class 2 SCCP for connection-oriented services.

The connectionless services of the SCCP layer 327 are used by the BSSMAP entity 325. The connection-oriented services are used by the BSSMAP entity 325, DTAP-MM entity 324 and DTAP-CM entity 323. For connection-oriented services, the bi-directional transfer of messages between the peer SCCP users in the intelligent base station 404 and the mobile switching center 415 is performed by setting up SCCP connections. Several signalling links may be multiplexed onto one physical signalling channel. One SCCP connection is set up for each user (e.g., CPRU 402) having more than one transaction. An SCCP connection can be set up on demand via the SCCP layer 327 by either the intelligent base station 404 or the mobile switching center 415; however, link release can preferably be initiated only by the mobile switching center 415. In a particular embodiment, only basic connection-oriented services are provided by the SCCP layer 327, without sequencing or flow control for user data.

Connection-oriented functions for the BSSMAP entity 325 are generally call/transaction related and are used to support specific user stations (mobile stations or CPRUs 402). These connection-oriented functions include resource assignment, resource release, initial user station message, blocking/unblocking, global reset, paging, reset circuit and handover. The protocol messages used to support the connection-oriented functions for the BSSMAP entity 325 are preferably transferred using the connection-oriented services of the SCCP layer 327.

Examining in more detail the procedures associated with the connection-oriented functions of the BSSMAP entity 325, resource assignment involves, among other things, allocation of a radio signalling channel during initial establishment of communication. In one embodiment in which aspects of TDD and/or TDMA are used, allocation of a radio signalling channel is carried out when a time slot is acquired by the user station. Subsequently, during the call setup phase, the mobile switching center 415 uses a resource assignment procedure to assign bearer resources to the call. The mobile switching center 415 may, for example, request the intelligent base station 404 to assign resources by sending it a BSSMAP ASSIGNMENT REQUEST message that includes information as to the details of the radio resource required (e.g., speech/data rate, channel type, etc.), and the terrestrial bearer cahnnel to be used between the intelligent base station 404 and the mobile switching center 415. In response, the intelligent base station 404 then takes several actions. The intelligent base station 404 sets aside the requested bearer terrestrial resources for the IBS/MSC interface (i.e., the A-interface 419), as well as any transcoding unit resources required for the call (if a transcoding unit 112 such as shown in FIG. 1 is employed). The intelligent base station 404 assigns the required bearer radio resources for the call for the over-the-air connection. The intelligent base station 404 carries out any required signalling with the transcoding unit, if applicable, to get it synchronized and ready for call processing, and switches the bearer path through the intelligent base station 404 by connecting the assigned radio channel to the terrestrial channel linking the intelligent base station 404 and the mobile switching center 415. Completion of the assignment procedure is signalled to the mobile switching center 415 by sending a BSSMAP ASSIGNMENT COMPLETE message from the intelligent base station 404 to the mobile switching center 415.

Resource release is carried out after release of a call/transaction at the connection management (CM) level between the CPRU 402 and the mobile switching center 415, or after the completion of a mobility management (MM) procedure between the intelligent base station 404 and the mobile switching center 415. In one embodiment as described herein, to release call resources, the mobile switching center 415 sends a BSSMAP CLEAR COMMAND message to the intelligent base station 404 requesting that the radio and terrestrial resources for the call/transaction be released. The intelligent base station 404 then initiates signalling on the internal (i.e., Notes) interfaces to get the radio resources released, releases any terrestrial resources on the interface 419 between the intelligent base station 404 and the mobile switching center 415, and returns a CLEAR COMPLETE BSSMAP message to the mobile switching center 415. Upon receiving the CLEAR COMPLETE BSSMAP message, the mobile switching center 415 then releases the SCCP signalling link for the call/transaction. In parallel, the CPRU 402 and the intelligent base station 404 co-operate to release the radio resources in use for the call/transaction.

If radio channel release is required because of any reason arising at the intelligent base station 404, the intelligent base station 404 sends a BSSMAP CLEAR REQUEST message to the mobile switching center 415, and initiates resource release on the internal (i.e., Notes) interfaces. The release process on the A-interface 419 continues, with the mobile switching center 415 and the intelligent base station 404 entering into a CLEAR COMMAND-CLEAR COMPLETE exchange, and the subsequent release of the SCCP signalling link.

When the SCCP connection establishment for a signalling link between the intelligent base station 404 and mobile switching center 415 occurs, the intelligent base station 404 passes an initial "layer 3" message (for example, MM or CM SERVICE REQUEST, LOCATION UPDATING REQUEST, IMSI DETACH, or RR PAGING RESPONSE) as part of a BSSMAP COMPLETE LAYER 3 INFORMATION message. The initial "layer 3" message is piggybacked as part fo the associated SCCP connect request (CR) message to the mobile switching center 415.

The intelligent base station 404 uses a BSSMAP blocking procedure to inform the mobile switching center 415 of terrestrial circuits that are blocked at the intelligent base station 404, and the mobile switching center will then refrain from assigning such terrestrial circuits for calls (although calls in progress on a terrestrial circuit will be unaffected by the blocking). If, as part of call setup, the intelligent base station 404 receives a BSSMAP ASSIGNMENT COMMAND indicating a bearer terrestrial resource is blocked at the intelligent base station 404, the intelligent based station 404 returns a BSSMAP ASSIGNMENT FAILURE message to the mobiole switching center 415, with the case code indicating that the resource is blocked, and repeats the blocking procedure for the circuit with the mobile switching center 415. Terrestrial circuits may be blocked for a number of reasons, including by way of example: operations and maintenance intervention making the circuit unavailable for use; an equipment failure making the circuit unavailable; or the inability to access radio resources from the terrestrial resource. The blocking action is reversed by an unblocking procedure.

In one embodiment, blocking is initiated by the transmission of a BSSMAP Block Message identifying the affected circuit from the intelligent base station 404 to the mobile switching center 415. After transmission of the BSSMAP Block Message, the intelligent base station 404 will not allow the identified circuit to be selected for use by the mobile switching center 415, although, as noted, any call in progress on the circuit will not be affected by the blocking procedure. The mobile switching center 415 responds with a BSSMAP Block Acknowledgment Message. If the BSSMAP Block Acknowledgment Message is not received within a predetermined timeout period, the intelligent base station 404 may retransmit the BSSMAP Block Message. If no acknowledgement if received within the predetermined timeout period after transmission of the second BSSMAP Block Message, the intelligent base station 404 marks the affected circuit as "blocked" and sends an alarm to the operations, administration and management (OA&M) center.

Unblocking is initiated by the transmission of a BSSMAP Unblock Message identifying the affected circuit from the intelligent base station 404 to the mobile switching center 415. After transmission of the BSSMAP Unblock Message, the intelligent base station 404 releases the blocked circuit and makes it available for use by the mobile switching center 415. The mobile switching center 415 responds with a BSSMAP Unblock Acknowledgment Message. If the BSSMAP Unblock Acknowledgment Message is not received within a predetermined timeout period, the intelligent base station 404 may retransmit the BSSMAP Unblock Message. If no acknowledgement if received within the predetermined timeout period after transmission of the second BSSMAP Unblock Message, the intelligent base station 404 marks the affected circuit as "unblocked."

If, during call set-up, the intelligent base station 404 receives a channel assignment command (i.e., a BSSMAP Assignment Command Message) from the mobile switching center 415 identifying a bearer terrestrial resource that is blocked at the intelligent base station 404, then the intelligent base station 404 returns a BSSMAP Assignment Failure Message to the mobile switching center 415, with an argument indicating that the resource is blocked. The intelligent base station 404 then performs the blocking procedure for the identified circuit with the mobile switching center 415.

Another function carried out by the BSSMAP entity 325 is a global reset procedure which is used to initialize the intelligent base station 404 and the mobile switching center 415 in the event of a failure. In the event of a failure at the intelligent base station 404 that has resulted in the loss of transaction reference information, a BSSMAP Reset Message is sent by the intelligent base station 404 to the mobile switching center 415. The mobile switching center 415 releases affected calls, erases affected references, and puts all circuits into an idle state. After a predetermined guard period, the mobile switching center 415 sends a BSSMAP Reset Acknowledgment Message to the intelligent base station 404. On the other hand, in the event of a failure at the mobile switching center 415, a BSSMAP Reset Message is sent to the intelligent base station 404. The intelligent base station 404 releases affected calls and erases affected references. The intelligent base station 404 then conducts the BSSMAP blocking procedure described earlier herein with the mobile switching center 415 for all circuits that were blocked. After a predetermined guard period, the intelligent base station 404 returns a BSSMAP Reset Acknowledgment Message to the mobile switching center 415.

A reset procedure is also provided. If a circuit has to put into an idle state at the mobile switching center 415 due to an abnormal SCCP connection release, then the mobile switching center 415 sends a BSSMAP Reset Circuit Message to the intelligent base station 404. The intelligent base station 404 puts the circuit into an idle state and returns a BSSMAP Reset Circuit Acknowledgment Message to the mobile switching center 415. If the circuit is marked "blocked" at the intelligent base station 404, then the intelligent base station 404 also performs the BSSMAP blocking procedure for the circuit.

Paging and handover functionality is also implemented over the BSSMAP layer. Paging messages from the mobile switching center 415 are sent via the BSSMAP layer as connectionless messages. The intelligent base station 404 translates the received Paging Request Message into an internal Page "Note" for transfer over the internal Notes interface within the intelligent base station 404, for subsequent handling by the OTA protocol layer 311 of the intelligent base station 404.

Handover functionality may, but need not, be implemented in the wireless local loop architecture 401. If all of the user stations (i.e., CPRUs 402) are non-mobile, then handover need not be provided. However, in certain embodiments, handover may be added as an extension either to deal with possible interference that may occur in a fixed wireless local system, or else if desired to accommodate mobile users stations as well as fixed user stations. If handover is provided, then GSM "A-Interface" signalling procedures for handover are carried out at the BSSMAP layer (shown, e.g., in FIG. 4). The signalling messages received over the BSSMAP layer are mapped onto corresponding internal signalling messages for the internal Notes interface at the intelligent base station 404. Further details about handover are described later herein in connection with FIG. 5. As described later, handover may either be transparent or non-transparent. If transparent handover is implemented, handover between two intelligent base stations 404 would require minimal intervention by the mobile switching center 415, and the intelligent base station 404 would transmit a BSSMAP Handover Performed Message to the mobile switching center 415 to indicate completion of the handover. On the other hand, if non-transparent handover is implemented, then every handover between intelligent base stations 404 would appear to the mobile switching center 415 similar to a handover between base station controllers (such as 1109 in FIG. 11 or 1209 in FIG. 12). In such a case, the A-Interface inter-base station controller handover signalling procedure would be employed for such a non-transparent handover.

Mobility management functions are also provided within the wireless local loop architecture 401. A location updating procedure is triggered by a registration request when the CPRU 402 first powers up, or periodically by the intelligent base station 404 and/or the mobile switching center 415. For a registration request, a Location Update Request Message is formulated by the DTAP-MM entity 324 and transmitted using the GSM A-Interface signalling procedure to the mobile switching center 415. The mobile switching center 415 responds with a Location Update Accept Message or a Location Update Reject Message, depending on whether it accepts or rejects the registration request. The mobile switching center 415 may choose to initiate authentication procedures within the location updating procedure. When the user de-registers (for example, on power-down of the CPRU 402), the intelligent base station 404 carries out an IMSI detach procedure over the A-Interface. In the "IMSI-detached" state, the mobile switching center 415 does not forward page messages to the intelligent base station 404, thereby conserving paging resources.

The mobility management layer (including DTAP-MM entity 324 illustrated in FIG. 4) also provides a set of connection management functions to the overlying connection management (CM) entities, including such functions as call control, supplementary services, and short message services. This set of mobility management functions is modeled in GSM by way of a mobility management (MM) connection.

The intelligent base station 404 initiates MM connection procedures for a connection management (CM) entity when the CM entity issues a call-initiating message. For a connection management call control (CM-CC) call, MM connection procuedures are initiated when an internal Set Link message (Note) is received over the internal interface in the intelligent base station 404 from the internal Notes protocol layer 312 on the OTA side. In response to the Set Link message, the mobility management (MM) layer sends a control management (CM) Service Request Message to the mobile switching center 415 to begin the call initiation. For a connection management supplementary services (CM-SS) call, the mobility management (MM) connection procedures are initiated when a connection management supplementary services (CM-SS) Register Message is received by the intelligent base station 404 from the CPRU 402. In response, the mobility management (MM) layer sends a CM Service Request Message to the mobile switching center 415. On completion of the mobility management transaction (i.e., handshakes with the CPRU 402), the DTAP-CM entity 323 is notified of successful completion of the mobility management connection procedures, and it forwards the Register Message to the mobile switching center 415. Should the mobile switching center 415 decide to invoke special operations, such as authentication and ciphering signalling, as part of call set-up, such operations may be carried out within the mobility management connection handshakes. In one embodiment, all connection management transactions for a given user use the same underlying SCCP connection with the mobile switching center 415.

An authentication procedure may be invoked either as part of call setup or location updating, or independently by the mobile switching center 415. In the situation where the authentication procedure is initiated independent of a call setup or location update procedure, an SCCP connection is first established between the intelligent base station 404 and the mobile switching center 415 to carry the authentication signalling messages. For authentication which is carried out as part of a call setup of location updating procedure, the mobile switching center 415 may choose to invoke the authentication procedure on a "1-in-N attempts" basis per use—in other words, the authentication procedure is not invoked for every instance of a call setup or location updating procedure.

Other connection management functions provided by the MM layer include an identification procedure and an abort procedure. The identification procedure is initiated by the mobile switching center 415 to request the CPRU 402 to provide specific identification parameters to the network. The abort procedure is invoked by the mobile switching center 415 to abort any on-going mobility management connection establishment, as well as all established mobility management connections, for a given user. The mobile switching center 415 initiates an abort procedure by transmitting an Abort Message to the intelligent base station 404. When the intelligent base station 404 receives the Abort Message, it aborts any on-going mobility management (MM) connection establishment procedure and releases all existing mobility management connections for the user. It also triggers signalling on the internal Notes interface and the OTA interface to request the connection management (CM) layer on the CPRU 402 release all ongoing connection management transactions for the user.

Various connection management functions are provided by the DTAP-CM entity 323 (see FIG. 3) of the intelligent base station 404. However, the DTAP-CM entity 323 primarily performs a relay function, in that it relays connection management (CM) protocol messages between the CPRU 402 and the mobile switching center 415, without actually processing the messages. Among the connection management functions that are provided by the DTAP-CM entity 323 is user termination of call setup. When a connection management call control (CM-CC) layer Setup Message is received at the intelligent base station 404 from the mobile switching center 415, the DTAP-CM entity 323 of the intelligent base station 404 stores the setup request and initiates signalling link establishment on the over-the-air interface 403. Once link establishment is complete, the DTAP-CM entity 323 retrieves and forwards the Setup Message to the CPRU 402. Another connection management function provided by the DTAP-CM entity 323 is a supplementary services registration procedure. When a connection management supplementary services (CM-SS) Register Message is received from the CPRU 402 to register supplementary services, the DTAP-CM entity 323 stores the request and initiates mobility management (MM) connection procedures at the mobility management (MM) layer. Once the mobility management connection procedures have been completed, the Register Message is retrieved and forwarded by the intelligent base station 404 to the mobile switching center 415.

Addressing of the CPRUs 402 within the wireless local loop architecture 402 can be similar to addressing in a full mobility system—that is, using unique personal identification numbers (PIDs) or international mobility subscriber identifiers (IMSIs) to identify a CPRU 402, and/or user of an equipment subscriber number (ESN) or international mobile equipment identifier (IMEI) as an equipment identifier for a CPRU 402. Further addressing techniques and principles that may be used in connection with the wireless local loop architecture 402 are described in copending U.S. patent application Ser. No. 08/532,466, filed Sep. 22, 1995, issued as U.S. Pat. No. 6,021,333, previously incorporated herein by reference as if set forth fully herein.

For each intelligent base station 404 in a wireless local loop system, a base station identifier is preferably provided. Similarly, for each cell (assuming the wireless local loop is deployed as part of a cellular system), a cell identity if preferably provided. The cell identity information is preferably sufficient for the intelligent base station 404 to fuild complete GSM cell identification values that may be passed around in messages over the A-Interface 419. Further, cell-to-base station mappings are preferably provided, so as to indicate which cell(s) a given intelligent base station 404 controls.

Location areas are preferably configured via the operations, administration and management (OA&M) entity of the system. In GSM parlance, a location area is a group of cells. Each mobile switching center 415 generally controls one or more location areas. Information relating to location areas may be transmitted in over-the-air broadcasts as well as in transactions between the intelligent base station 404 and the mobile switching center 415.

The interworking functions 310, 320 (see FIG. 3) within the intelligent base station protocol architecture 301 provides a translation function between internal base station messages (referred to as Notes) and messages sent over the A-Interface 419. The interworking functions 310, 320 apply to procedures, messages and information elements passed over the internal and external base station interfaces. More specifically, these functions include interworking between radio resource management signalling contained within the internal (Notes) base station protocol and the BSSMAP signalling over the A-Interface 419; interworking between mobility management signalling within the internal (Notes) base station protocol and the mobility management (MM) layer signalling on the A-Interface 419; and relay of connection management (CM) messages between the CPRU 402 and the mobile switching center 415 through the intelligent base station 404. These CM messages are transported as Transport Messages (also referred to as Transport Notes) over the internal (Notes) base station interface, and as DTAP messages over the A-Interface 419.

Certain operations, administration and management (OA&M) functions are provided by the line processor 303 within the intelligent base station protocol architecture 301. Since there is preferably no base station controller controlling the intelligent base station 404, the line processor 303 acts, on the one side, as an OA&M agent that is managed by an operations and maintenance center (OMC) (not shown). On the other side, the line processor 303 coordinates the OA&M functions for the OTA processor 302 (see FIG. 3) of the intelligent base station 404. At a general level, the line processor 303 has two categories of OA&M functions: (1) OA&M relating to the physical and logical entities of the line processor 303 itself within the intelligent base station 404; and (2) co-ordination of OA&M for the OTA processor 302 of the intelligent base station 404. The OTA processor 302 acts as an agent in a manager-agent relationship with the line processor 303, and carries out the OA&M functions for itself.

Figure 6:
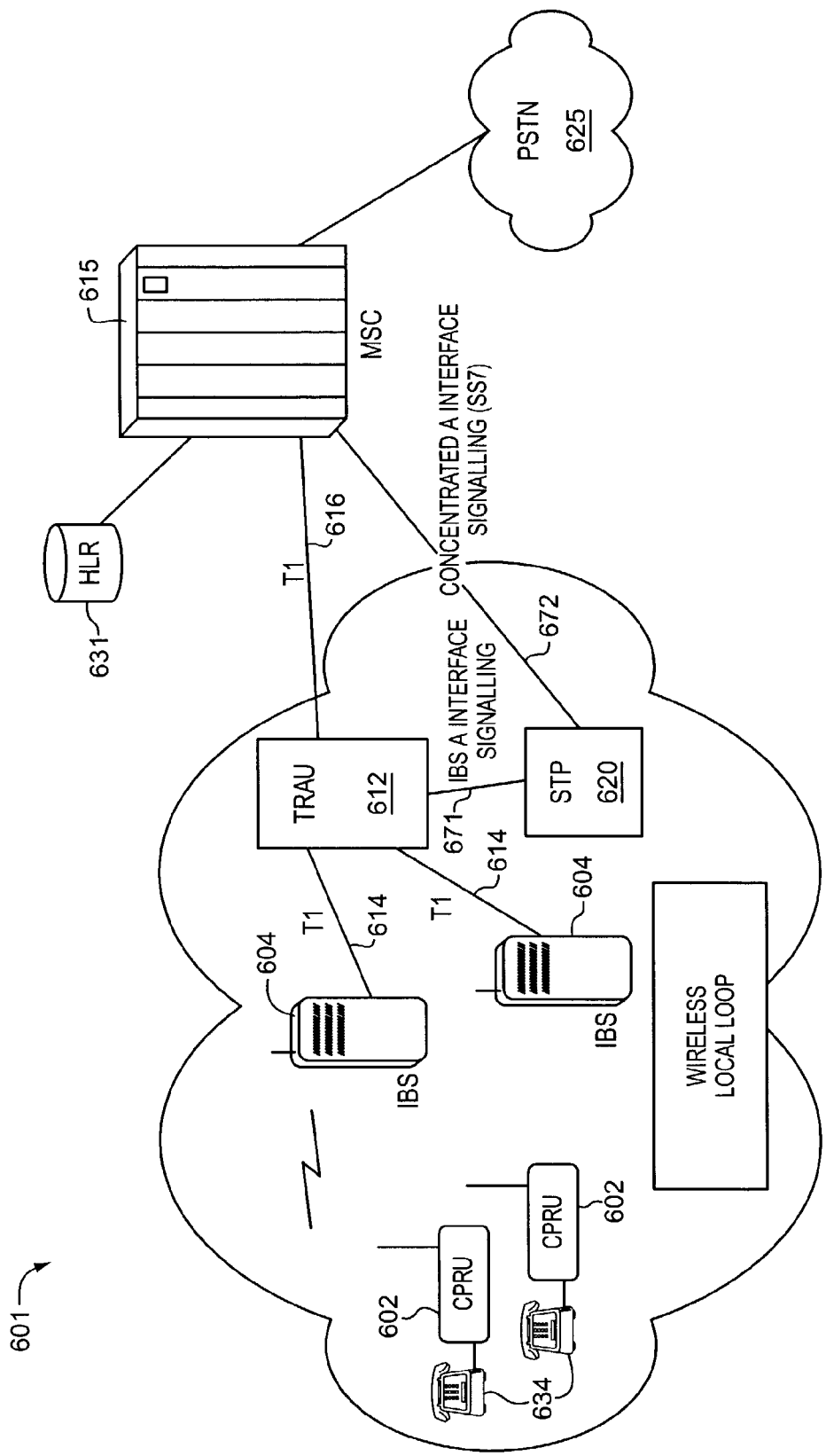
FIG. 6 is a diagram a wireless local loop communication system in which a transcoder and rate adapter unit is connected to multiple intelligent base stations.

FIG. 6 is a diagram of another embodiment of a wireless local loop system in accordance with one or more aspects of the present invention. As illustrated in FIG. 6, a wireless local loop system 601 comprises one or more intelligent base stations 604 (such as intelligent base station 104 shown in FIG. 1 or intelligent base station 404 shown in FIG. 4), which communicate with various CPRUs 602 (such as CPRU 102 shown in FIG. 1 or CPRU 402 shown in FIG. 4). Each intelligent base station 604 communicates with a mobile switching center 615 via a transcoder and rate adapter unit (TRAU) 612 and a signalling transfer point (STP) unit 620. The intelligent base stations 604 may be connected to the transcoder and rate adapter unit 612 over backhaul lines 614 (which may comprise, for example, T1 or fractional T1 lines), and the transcoder and rate adapter unit 612 may likewise be connected to the mobile switching center 615 over additional backhaul lines 616 (which may also comprise T1 or fractional T1 lines). The mobile switching center 615 may also be connected to a home location register (HLR) 631, and to a telephone network (PSTN) 625.

In operation, the intelligent base station 604 transmits and receives information to the transcoder and rate adapter unit 612. The transcoder and rate adapter unit 612 comprises a number of transcoding unit shelves, operating independently of one another but under the control of one or more of the intelligent base stations 604. Each transcoding unit shelf may support, for example, up to 92 bearer channels.

The transcoder and rate adapter unit 612 generally provides the network side processing of certain functions on the bearer path. These functions may include, for example, speech transcoding, network-side forward error correction (FEC), and network-side enciphering and deciphering of bearer voice.

With respect to the speech transcoding function, the transcoder and rate adapter unit 612 may provide bidirectional conversion between encoded voice data received from the user side, and "mu-law" coded pulse-code modulated (PCM) data received from the network side. A vocoder in the CPRU 602 (such as vocoder 221 depicted in the diagram of exemplary CPRU 201 of FIG. 2) compresses speech received from the telephone 235 (see FIG. 2) for over-the-air transmission towards the network. In the reverse direction, the vocoder in the CPRU 602 de-compresses over-the-air speech prior to transmission to the CPRU 602.

The transcoder and rate adapter unit 612 preferably comprises, among other things, a speech encoder and speech decoder. The speech encoder in the transcoder and rate adapter unit 612 receives PCM speech data from the network (delivered at, e.g., 64 kilobits per second), and compresses this data into a sub-rate over-the-air channel for transmission towards the CPRU 602. Forward error correction (FEC) information is added separately at the transcoder and rate adapter unit 612 by an FEC function. The speech decoder in the transcoder and rate adapter unit 612 processes compressed speech data from the CPRU 602, and transcodes this data to produce 64 kbit/s PCM speech data for transmission towards the mobile switching center 615. The speech decoder in the transcoder and rate adapter unit 612 additionally provides an interpolate function to output predicted speech patterns, in the event that the intelligent base station 604 detects frames that contain errors that are not correctable by the forward error correction function. The speech decoder in the transcoder and rate adapter unit 612 also provides a mute capability for silencing the output to the A-interface when necessary, such as during control traffic transmissions.

With regard to forward error correction (FEC), in the user-to-network direction the FEC information is added on to messages by the CPRU 602. The channel decoding function in the transcoder and rate adapter unit 612 uses the FEC information to detect the presence of errors, and to estimate the most probable emitted bits given the received ones. In the network-to-user direction, the transcoder and rate adapter unit 612 applies forward error correction on the frames received from the vocoding function. The FEC decoding in the network-to-user direction is performed by the CPRU 602.

With regard to encryption and decryption functions, a bearer encryption (or ciphering) mechanism utilized in the system is preferably based on the GSM A5/1 algorithm, which is an algorithm well known in the art. For bearer speech, the two endpoints in the system for encryption and decryption are the CPRU 602 and the transcoder and rate adapter unit 612. Where communication is divided into time frames and time slots (such as in certain types of time division multiple access or TDMA systems, examples of which are shown in FIGS. 9 and 10 and described later herein), encryption and decryption may be performed on a per-frame basis.

The CPRU 602 and the transcoder and rate adapter unit 612 may be "encryption synchronized" in the sense that the frame number used by the CPRU 602 to encrypt a frame is the same as the frame number used by the transcoder and rate adapter unit 612 to decrypt, and vice versa. The GSM A5/1 algorithm involves the generation of encryption/decryption masks on a per-frame basis, based on the frame number. Typically, establishment or re-establishment of encryption synchronization occurs at call setup and when recovering from loss of encryption synchronization due to error conditions (whether experienced in the over-the-air link or the backhaul link). Once the encryption synchronization is established (or re-established, as the case may be), the CPRU 602 and the transcoder and rate adapter unit 612 increment the frame number for each frame cycle on the over-the-air and backhaul interfaces. Preferably, the same frame length (e.g., 20 milliseconds) is used for both the over-the-air and the backhaul time frames, so incrementing the frame number each frame cycle normally maintains frame number synchronization between the two endpoints of the encryption/decryption function.

A specialized interface carries concentrated A-interface signalling over SS7 links 672 between the STP unit 620 and the mobile switching center 615. To this effect, the transcoder and rate adapter unit 612 may route signalling messages directed to and from the intelligent base station 604 through the STP unit 620 for transport over the SS7 links 672. Preferably, the transcoder and rate adapter unit 612 provides transparent pass-through of signalling between the intelligent base station 604 and mobile switching center 615 over the SS7 links 672. The other backhaul lines 616 may carry signalling for OAM&P control of the transcoder and rate adapter unit 612. Inband signalling may be performed between the transcoder rate adapter unit 612 and the base station controller 112 for dynamic per-call control of the transcoding unit functions. Signalling exchanged between the transcoder and rate adapter unit 612 and the intelligent base station 604 may be concentrated in a specific T1 time slot (e.g., the first time slot of a time frame), and controlled through the level-2 link-access procedures for the D-channel (LAPD) protocol.

FIG. 7 is a diagram of another embodiment of a wireless local loop system 701. The wireless local loop system 701 in FIG. 7 is similar to the wireless local loop system 601 depicted in FIG. 6, except the system 701 of FIG. 7 employs base stations 704 that do not substantially incorporate base station controller functionality; rather, a separate base station controller 780 is provided between the base stations 704 and the mobile switching center 715. A transcoder and rate adapter unit 781 is incorporated as part of the base station controller 780. In operation, the functionality of the transcoder and rate adapter unit 612 described with respect to the embodiment of FIG. 6 is incorporated within the base station controller 780 of the embodiment of FIG. 7. The transcoder and rate adapter unit 781, as with its counterpart in FIG. 6, provides the network side processing of functions on the bearer path such as speech transcoding, network-side forward error correction (FEC), and network-side enciphering and deciphering of bearer voice, as previously described with respect to the embodiment of FIG. 6. In the embodiment of FIG. 7, the signalling functions over the A-interface are incorporated in the base station controller 780, thus eliminating the STP unit 620 that is utilized in the embodiment of FIG. 6.

Figure 5:
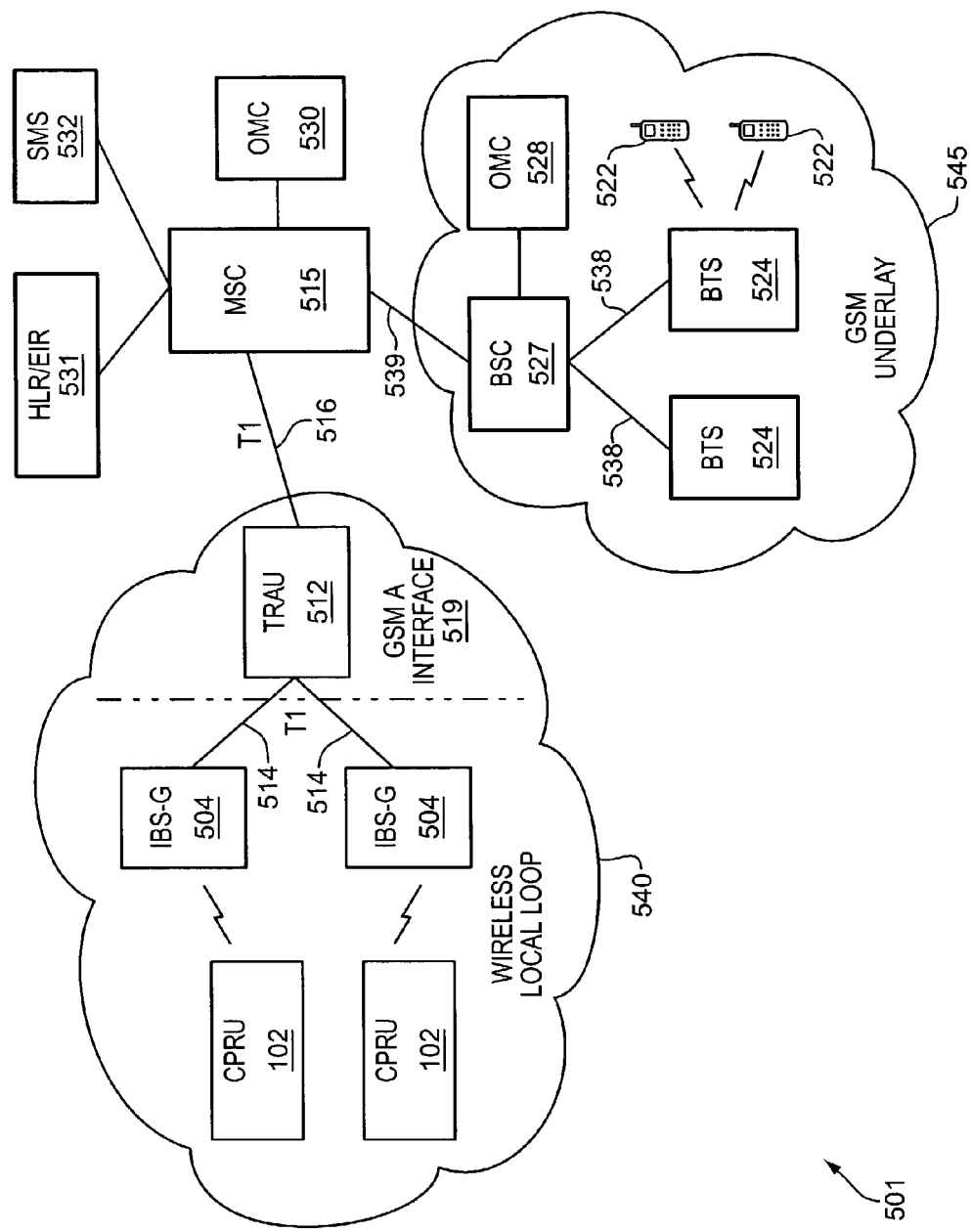
FIG. 5 is a diagram of a wireless communication system serving both mobile and non-mobile users.

FIG. 5 illustrates one embodiment of a communication network architecture having both wireless local loop functionality and full mobility functionality. As illustrated in FIG. 5, a communication network 501 comprises a wireless local loop subsystem 540 and a wireless mobile subsystem 545, each of which connects to a mobile switching center 515. In one embodiment, the wireless mobile subsystem 545 comprises a GSM underlay network supporting full mobility, and can use the same mobile switching center(s) 515 as the wireless local loop subsystem 540.

In a preferred embodiment, with reference again to FIG. 5, the wireless local loop subsystem 540 comprises one or more intelligent base stations 504 which may communicate with one or more CPRUs 502 in a manner similar to the intelligent base station 104 and CPRUs 102 illustrated in FIG. 1. Backhaul lines 514 (which may be, e.g., T1 lines) connect the intelligent base stations 504 to a transcoder and rate adapter unit (TRAU) 512, which serves a purpose similar to that described in FIG. 1. The transcoder and rate adapter unit 512 is connected to the mobile switching center 515 via another backhaul line 516, which may also comprise, like backhaul lines 514, a T1 line.

The wireless mobile system 545 comprises one or more base stations 524 which communicate with fixed or mobile user stations 522. Preferably, the base stations 524 operate according to a GSM communication protocol, but the base stations 524 may operate according to other communication protocols as well. The base stations 524 are connected to a base station controller 527 via backhaul lines 538, which may comprise, for example, T1 lines. The base station controller 527 is connected to a mobile system operations and maintenance center (OMC) 528. The base station controller 527 is also connected to the mobile switching center 515 via backhaul line 539, which may, like backhaul lines 538, also comprise a T1 line.

The mobile switching center 515 itself is preferably linked to a number of other system components which facilitate the operation and functioning of the wireless communication system 501. Thus, the mobile switching center 515 is shown in FIG. 5 as connected to a global system operations and maintenance center (OMC) 530, as well as to a short message service (SMS) system 532 and a home location register/equipment identification register 531.

Figure 8A:
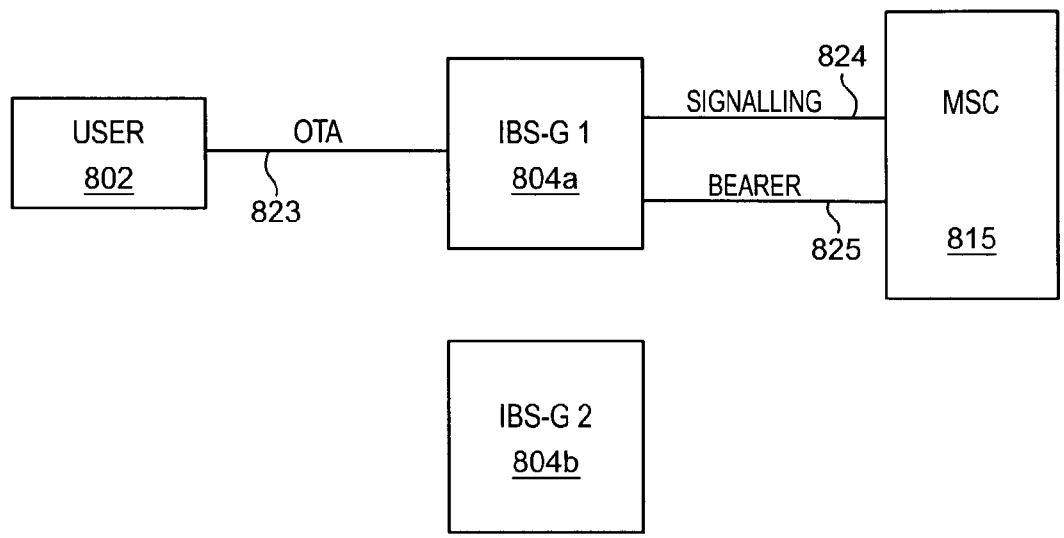
FIGS. 8A–8C are diagrams illustrating handoff within a wireless communication system supporting mobile user stations, such as the communication system shown in FIG. 5.
Figure 8B:
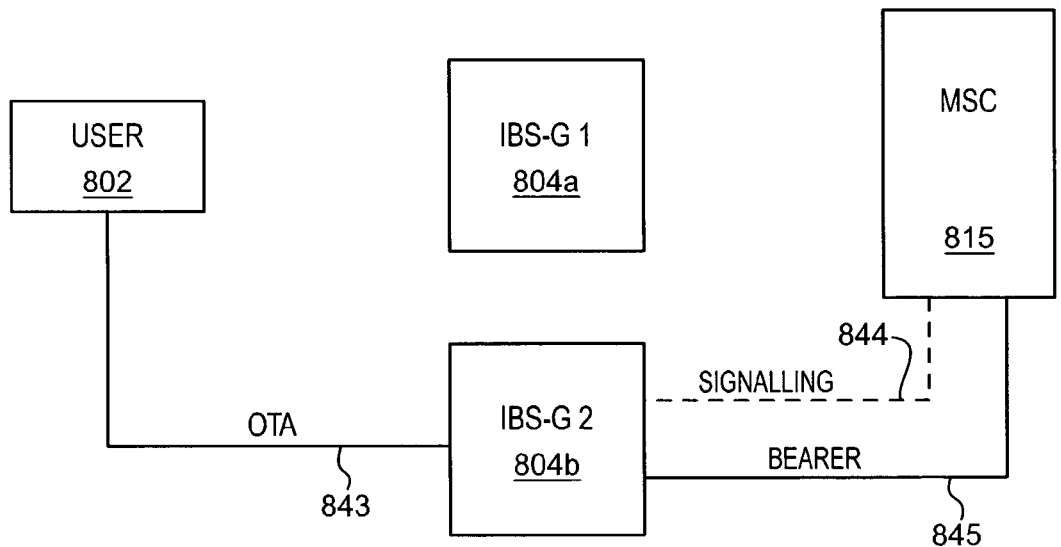
Figure 8C:
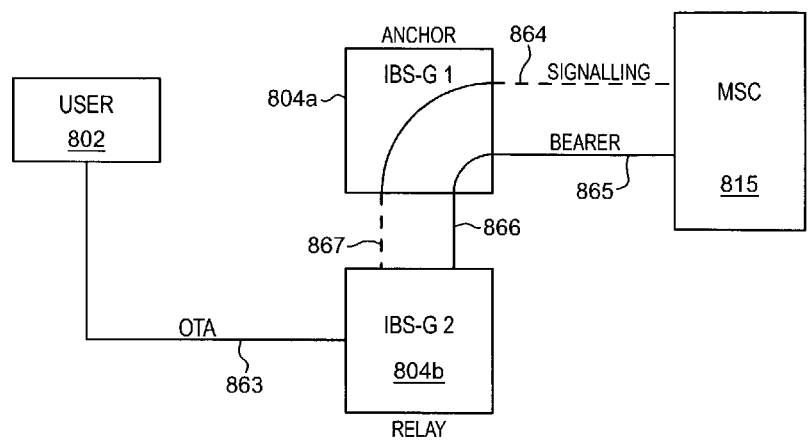

In one embodiment, the wireless local loop subsystem 540 handles certain mobility management functions (such as registration, authentication and the like), and is configured to support mobile handoff between intelligent base stations 504. Examples of two different types of handoff procedures are illustrated in FIGS. 8A–8C. In FIG. 8A, a user 802 (such as a mobile station) is in the process of communicating with an intelligent base station 804a across an over-the-air (OTA) communication link 823. To support the call ongoing over the OTA communication link 823, the intelligent base station 804a communicates with the mobile switching center 815 over a signalling channel 824 and a bearer channel 825. At that point, no communication is being carried out between the user 802 and the second intelligent base station 804b shown in FIG. 8A.

When a handover of the user station 802 is necessary or desirable, a new over-the-air (OTA) communication link is established with the target intelligent base station 804b. The new OTA communication link can be established either at the initiation of the user station 802 or at the initiation of the intelligent base station 804b. In a preferred embodiment, the new OTA communication link is established at the initiation of the user station 802, according to techniques described, for example, in copending U.S. patent application Ser. No. 08/284,053 filed on Aug. 31, 1994, hereby incorporated by reference as if set forth fully herein. In such an embodiment, the intelligent base station 804b transmits a general polling signal in one or more time slots available for communication, and the user station 802 responds to the general polling message in a time slot indicated as available for communication by transmitting a general response message identifying the user station 802.

In one embodiment, every handover between intelligent base stations 804a, 804b is visible (non-transparent) to the mobile switching center 815. In a preferred version of such an embodiment, the user station 802 establishes a new OTA communication link 843 with the target intelligent base station 804b, as illustrated in FIG. 8B. The target intelligent base station 804b notifies the mobile switching center 815 and/or the source intelligent base station 804a that a handover has been requested, and the call is then transferred over to the target intelligent base station 804b. As a result, a signalling channel 844 and a bearer channel 845 are established between the mobile switching center 814 and the target intelligent base station 804b to support the ongoing call. In one aspect, the mobile switching center 815 views the handover as an inter-BSC (base station controller) handover, since each of the two intelligent base stations 804a, 804b is visible to it acting in a capacity of a base station controller, similar to base station controller 527 in FIG. 5. Consequently, the handover procedure incurs the overhead of A-interface signalling for an inter-BSC handover. However, very few, if any, hardware changes would be required to support this type of handover procedure.

FIG. 8C illustrates such a handover procedure in which handovers between intelligent base stations within a defined cluster occur without being visible to the mobile switching center 815—that is, without handover signalling normally required for a BSC-related handover having to occur on the A-interface. To support the handoff procedure of FIG. 8C, the intelligent base stations 804a, 804b preferably have physical connectivity between them, so that handover signalling between the intelligent base stations 804a, 804b can occur directly. In the handover procedure illustrated by FIG. 8C, handover signalling messages are exchanged between the two intelligent base stations 804a, 804b using the physical connection between them, and the source intelligent base station 804a then tunnels the A-interface signalling channel 864 and bearer channel 865 through to the target intelligent base station 804b, via signalling channel 867 and bearer channel 866 shown in FIG. 8C which are carried over the physical link connecting the two intelligent base stations 804a, 804b. The first intelligent base station 804a, through which the call had originated, becomes the anchor base station for the call, and the second intelligent base station 804b becomes a relay base station. For the remainder of the call duration, the path for signalling and traffic between the user station 802 and the mobile switching center 815 passes through both intelligent base stations 804a, 804b, and the anchor intelligent base station 804a does not relinquish control of the call. An advantage of this approach is that within defined clusters of intelligent base stations 804, handover between intelligent base stations 804 can occur without significant signalling required over the A-interface, resulting in reduced handover load on the mobile switching center 815. A relatively simple protocol may be used to handle the required signalling between intelligent base stations 804 to handle handover situations.

FIGS. 9 and 10 are timing diagrams for two exemplary frame structures that can be used for communication between a base station 104 (or 404) and various user stations, including the CPRU(s) 102 (or 402). In the frame structure depicted in FIG. 9, aspects of both time division multiple access (TDMA) and spread spectrum communication are utilized. As shown in FIG. 9, a polling loop 980 (also called a "major frame") comprises a plurality of time slots 981 (also called "minor frames"). Each minor frame 981 provides a channel for time division duplex (TDD) communication between a base station (e.g., cellular station) and a user station (e.g., fixed or mobile user)—that is, the base station 104 (or 404) transmits to a user station (such as CPRU 102 or 402) and the user station transmits back to the base station 104 (or 404) within the same minor frame 981. More specifically, as shown in an exploded view of a portion of the polling loop 980 in FIG. 9, a minor frame 981 comprises a mobile or user transmission 982 preceding a base transmission 983. The minor frame 981 also comprises a variable radio delay gap 984 preceding the user transmission 982, followed by a turn-around gap 988 and a guard time gap 989. After gap 989 is the base transmission 983, which is followed by another turn-around gap 993. The user transmission 982 comprises a preamble 985, a preamble sounding gap 986, and a user message interval 987. The base transmission comprises a preamble 990, a preamble sounding gap 991, and a base message interval 992.

In the alternative frame structure shown in FIG. 10, aspects of frequency division multiple access (FDMA) and TDMA are utilized. As shown in FIG. 10, a first frequency band 1060 is allocated to a base station 109 for base-to-user transmissions, and another frequency band 1061 is allocated to user stations (e.g., CPRUs, handsets, or other wireless units) for user-to-base transmissions. A repeating major time frame (or "polling loop") 1051 is defined for communication over each frequency band 1060, 1061. A plurality (e.g., sixteen) of duplex time slots are available for communication. Both base time slots 1052 and user time slots 1053 are defined within the repeating major time frame 1051, with the user time slots 1053 preferably lagging behind the base time slots 1052 by a prescribed amount of time (such as one-half the duration of the major time frame 1051). This time lag or slot offset 1055 allows user stations time to receive transmissions over the base frequency band 1060 in the assigned base time slot 1052, process the base-to-user transmissions, perform a transmit/receive frequency switch, and transmit a reverse link transmission in the corresponding user time slot 1053, without having to wait an entire time frame duration to transmit a reverse link transmission.

While exemplary frame structures for wireless communication between a base station 104 (or 404) and CPRUs 102 (or 402) are depicted in FIGS. 9 and 10, and the details and protocols relating thereto generally described above, other frame structures and associated protocols may be used instead. It will be appreciated by those skilled in the art that a wide variety of frame structures and protocols would be usable in the various wireless communicaiton network architectures described herein.

In a preferred embodiment, the base station 104 (or 404) is part of a cellular network that employs aspects of FDMA, TDMA and/or CDMA for cell isolation. In an exemplary embodiment, users are isolated, and multiple access is achieved, through TDMA. Frequency division duplexing (FDD) is utilized to permit multiple full duplex users to share a common RF radio frequency. Adjacent cells in the cellular network are assigned one of a predefined set of frequency channels and use a code reuse pattern of seven to achieve isolation between the cells. Direct sequence spread spectrum transmissions are used by the base stations 104 and the users within a cell, including the CPRU 102 (or 402). Spread spectrum communication reduces interference between cells as well as with respect to other systems (e.g., PCS systems) operating within the same proximity. Cells in adjacent clusters use a variety of interference rejection techniques, including orthogonal or near orthogonal spreading codes, transmit power control, directional antennas and time slot interchange (TSI).

Communication channels are preferably assigned to the CPRU 102 (or 402) on a demand basis, although they may, in certain embodiments, be pre-allocated as well. An advantage of dynamic assignment of over-the-air communication channels is that more users can be supported. For the protocol shown in FIG. 10, over-the-air communication channels are preferably assigned based on requests from the CPRU 102 (or 402) to the base station 104 (or 404). The assignment of over-the-air communication channels is carried out in the same fashion for mobile users (if any) that also communicate with the base station 102—i.e., according to the cellular communication protocol for the network of which the base station 102 is a part. For example, over-the-air communication channels may be assigned with the assistance of a dedicated control channel. Over-the-air communication channels may also be assigned according to techniques similar to those described in, for example, U.S. patent application Ser. No. 08/463,220 filed on Jun. 5, 1995, issued as U.S. Pat. No. 5,689,502, hereby incorporated by reference as if set forth fully herein. Any other suitable mechanism for allocating or assigning over-the-air communication channels may also be used.

A local area communication system (i.e., wireless local loop system) according to certain aspects of the present invention may be comparatively easy to deploy in remote and/or rural areas, in contrast to systems requiring landline connections from a PBX or KTS to the network. With the addition of connecting the wireless access communication unit to the PBX or KTS, a remotely-located local area communication system can obtain benefits of a wireless network (including long distance access) for relatively little extra deployment effort.

While preferred embodiments of the invention have been described herein, many variations are possible which remain within the concept and scope of the invention. Such variations would become clear to one of ordinary skill in the art after inspection of the specification and the drawings. The invention therefore is not to be restricted except within the spirit and scope of any appended claims.

What is claimed is:

1. A communication system, comprising:
a wireless unit comprising a first transmitter and a first receiver;
an intelligent base station to operate without a base station controller, the intelligent base station comprising a second transmitter, a second receiver, an over-the-air processor, a line processor, and an internal signaling protocol layer, the over-the-air processor to manage communication between the intelligent base station and the wireless unit over a wireless communication channel, the line processor comprising a base station subsystem management application part (BSSMAP), a signaling connection control part (SCCP), and a message transfer part (MTP), the internal signaling protocol layer to allow communication of signaling information between the over-the-air processor and the line processor;
a non-wireless unit to be connected to the wireless unit, the non-wireless unit to exchange information with the intelligent base station using the wireless unit; and
a mobile switching center to be coupled to the intelligent base station over an interface.

2. The communication system of claim 1, further comprising a transcoding and rate adapter unit interposed between the intelligent base station and the mobile switching center.

3. The communication system of claim 1, wherein the non-wireless unit and the wireless unit communicate across an RJ-11 interface.

4. The communication system of claim 1, wherein the wireless unit comprises an RJ-11 interface and a data interface, the data interface transmitting and receiving digital data.

5. The communication system of claim 1, wherein the first transmitter and the second transmitter each comprise a spread spectrum transmitter, and wherein the first receiver and the second receiver each comprise a spread spectrum receiver.

6. The communication system of claim 5, wherein the intelligent base station is to generate a repeating time frame comprising a plurality of time slots, and wherein the wireless communication channel is defined by at least one of the time slots.

7. The communication system of claim 1, wherein the interface connecting the intelligent base station and the mobile switching center comprises a GSM A-interface.

8. The communication system of claim 1, wherein the intelligent base station communicates with the wireless unit over the wireless communication channel using a non-GSM over-the-air protocol.

9. The communication system of claim 1, wherein the mobile switching center and the wireless unit are peer-to-peer endpoints for GSM connection management, and wherein the mobile switching center communicates with the intelligent base station across a GSM signaling interface.

10. The communication system of claim 9, wherein the GSM signaling interface between the mobile switching center and the intelligent base station further comprises a GSM base station subsystem mobile application part (BSS-MAP) and a GSM mobile transfer part (MTP).

11. The communication system of claim 1, further comprising a second intelligent base station, the second intelligent base station connected to the mobile switching center over a second interface.

12. The communication system of claim 1, wherein the non-wireless unit comprises a telephone.

13. A method for wireless communication in a local loop comprising:
   establishing a plurality of wireless communication channels between a plurality of wireless units and an intelligent base station, the intelligent base station operation without a base station controller, the intelligent base station comprising:
      an over-the-air processor, the over-the-air processor managing communication between the intelligent base station and the plurality of wireless units;
      a line processor comprising a base station subsystem management application part (BSSMAP), a signaling connection control part (SCCP), and a message transfer part (MTP); and
      an internal signaling protocol layer, the internal signaling protocol layer allowing communication of signaling information between the over-the-air processor and the line processor;
   connecting a plurality of non-wireless units to the wireless units, at least one non-wireless unit being connected to each wireless unit;
   exchanging information between the non-wireless units and the intelligent base station using the corresponding wireless unit as an intermediary; and
   connecting the intelligent base station to a GSM mobile switching center.

14. The method of claim 13, wherein connecting the intelligent base station to the GSM mobile switching center comprises connecting the intelligent base station to a transcoding and rate adapter unit, and connecting the transcoding and rate adapter unit to the GSM mobile switching center.

15. The method of claim 13, wherein connecting the plurality of non-wireless units to the wireless units comprises connecting at least one of the non-wireless units to a wireless unit across an RJ-11 interface.

16. The method of claim 13, further comprising communicating between the intelligent base station and the wireless units by spread spectrum encoding data for transmission between the intelligent base station and each of the wireless units, and spread spectrum decoding the data when received at the intelligent base station or the wireless units.

17. The method of claim 16, further comprising generating, at the intelligent base station, a repeating time frame comprising a plurality of time slots, wherein each of the wireless communication channels is defined by at least one of the time slots.

18. The method of claim 13, wherein connecting the intelligent base station to the GSM mobile switching center comprises connecting the intelligent base station to the GSM mobile switching center across a GSM A-interface.

19. The method of claim 13, wherein the mobile switching center and the wireless units are peer-to-peer endpoints for GSM connection management, and wherein connecting the intelligent base station to the GSM mobile switching center comprises communicating between the mobile switching center and the intelligent base station across a GSM signaling interface.

20. The method of claim 19, wherein communicating between the wireless units and the intelligent base station comprises communicating between the intelligent base station and each wireless unit using a non-GSM over-the-air protocol.

21. A communication system, comprising:
   a plurality of wireless units, each of the wireless units comprising a local transmitter and a local receiver;
   an intelligent base station capable of communicating with the plurality of wireless units using a plurality of wireless communication channels without a base station controller, the intelligent base station comprising:
      an intelligent base station transmitter;
      an intelligent base station receiver;
      an over-the-air processor, the over-the-air processor managing communication between the intelligent base station and the plurality of wireless units;
      a line processor comprising a base station subsystem management application part (BSSMAP), a signaling connection control part (SCCP), and a message transfer part (MTP); and
      an internal signaling protocol layer, the internal signaling protocol layer allowing communication of signaling information between the over-the-air processor and the line processor;
   a plurality of non-wireless units, each of the non-wireless units to be connected to one of the wireless units and to exchange information with the intelligent base station using the corresponding wireless unit to which it is to be connected; and
   a mobile switching center to be connected to the intelligent base station across an interface.

22. The communication system of claim 21, further comprising a transcoding and rate adapter unit to be interposed between the intelligent base station and the mobile switching center.

23. The communication system of claim 21, wherein at least one of the non-wireless units and one of the wireless units communicate across an RJ-11 interface.

24. The communication system of claim 21, wherein the intelligent base station transmitter and each of the local transmitters of the wireless units each comprises a spread spectrum transmitter, and wherein the intelligent base station receiver and each of the local receivers of the wireless units comprises a spread spectrum receiver.

25. The communication system of claim 24, wherein the intelligent base station is to generate a repeating time frame comprising a plurality of time slots, and wherein the wireless communication channels are each defined by one or more of the time slots.

26. The communication system of claim 21, wherein the interface connecting the intelligent base station and the mobile switching center comprises a GSM A-interface.

27. The communication system of claim 21, wherein the intelligent base station is to communicate with the wireless units over the wireless communication channels using a non-GSM over-the-air protocol.

28. The communication system of claim 21, wherein the mobile switching center and the wireless units are peer-to-peer endpoints for GSM connection management, and wherein the mobile switching center is to communicate with the intelligent base station across a GSM signaling interface.

29. The communication system of claim 28, wherein the GSM signaling interface between the mobile switching center and the intelligent base station further comprises a GSM base station subsystem mobile application part (BSS-MAP) and a GSM mobile transfer part (MTP).

30. The communication system of claim 21, wherein one or more of the non-wireless units comprises a telephone.

31. The communication system of claim 21, further comprising a second intelligent base station, the second intelligent base station to be connected to the mobile switching center across a second interface.

* * * * *